(12) United States Patent
Nemoto et al.

(10) Patent No.: US 11,719,906 B2
(45) Date of Patent: Aug. 8, 2023

(54) DRIVING APPARATUS

(71) Applicant: CANON KABUSHIKI KAISHA, Tokyo (JP)

(72) Inventors: Ayumu Nemoto, Tokyo (JP); Toshio Ibi, Kawasaki (JP); Hajime Inoue, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 542 days.

(21) Appl. No.: 16/803,580

(22) Filed: Feb. 27, 2020

(65) Prior Publication Data

US 2020/0192055 A1 Jun. 18, 2020

Related U.S. Application Data

(63) Continuation of application No. PCT/JP2018/030258, filed on Aug. 14, 2018.

(30) Foreign Application Priority Data

Aug. 28, 2017 (JP) ................. 2017-163145
Aug. 28, 2017 (JP) ................. 2017-163146
(Continued)

(51) Int. Cl.
*G02B 7/04* (2021.01)
*G03B 3/10* (2021.01)
(Continued)

(52) U.S. Cl.
CPC ................. *G02B 7/04* (2013.01); *G03B 3/10* (2013.01); *G03B 5/00* (2013.01); *H02N 2/108* (2013.01);
(Continued)

(58) Field of Classification Search
CPC ... G02B 7/04; G03B 3/10; G03B 5/00; G03B 2205/0046; G03B 2205/0061; H02N 2/108
See application file for complete search history.

(56) References Cited

U.S. PATENT DOCUMENTS 9,225,899 B2 12/2015 Takizawa
2002/0018192 A1 2/2002 Nishi
(Continued)

FOREIGN PATENT DOCUMENTS

JP 2000-106340 A 4/2000
JP 2008-136292 A 6/2008
(Continued)

OTHER PUBLICATIONS

International Preliminary Report on Patentability dated Mar. 12, 2020, in International Application No. PCT/JP2018/030258.
(Continued)

*Primary Examiner* — Clayton E. LaBalle
*Assistant Examiner* — Diana Hancock
(74) *Attorney, Agent, or Firm* — Venable LLP

(57) ABSTRACT

A driving apparatus includes a movable portion, a fixed portion configured to hold the movable portion, and a controller configured to control a position of the movable portion relative to the fixed portion. At least part of the outer surface of the movable portion is a spherical surface. The fixed portion includes a plurality of vibrators configured to press and contact the spherical surface of the movable portion and to rotate the movable portion, and a pressure receiver configured to hold pressure contact states of the plurality of vibrators against the movable portion. The movable portion is held by the plurality of vibrators and the pressure receiver, and a spherical center of the spherical surface of the movable portion is located between a plane
(Continued)

passing through the plurality of vibrators and the pressure receiver.

8 Claims, 21 Drawing Sheets

(30) Foreign Application Priority Data

| Aug. 28, 2017 | (JP) | 2017-163147 |
| Aug. 28, 2017 | (JP) | 2017-163148 |
| Jul. 20, 2018 | (JP) | 2018-136548 |

(51) Int. Cl.
*G03B 5/00* (2021.01)
*H02N 2/10* (2006.01)

(52) U.S. Cl.
CPC ............ *G03B 2205/0046* (2013.01); *G03B 2205/0061* (2013.01)

(56) References Cited

U.S. PATENT DOCUMENTS

| 2012/0063652 A1* | 3/2012 | Chen | G06V 10/56 |
| | | | 382/128 |
| 2017/0312880 A1* | 11/2017 | Ishii | B24B 5/047 |

FOREIGN PATENT DOCUMENTS

| JP | 2009-159787 A | 7/2009 |
| JP | 2009-225591 A | 10/2009 |
| JP | 2010-124603 A | 6/2010 |
| JP | 2011-124622 A | 6/2011 |
| JP | 2013-150426 A | 8/2013 |
| JP | 2014-175774 A | 9/2014 |
| JP | 2016-211969 A | 12/2016 |
| WO | 2014/076958 A1 | 5/2014 |

OTHER PUBLICATIONS

International Search Report and Written Opinion dated Nov. 20, 2018, in International Patent Application No. PCT/JP2018/030258.

* cited by examiner

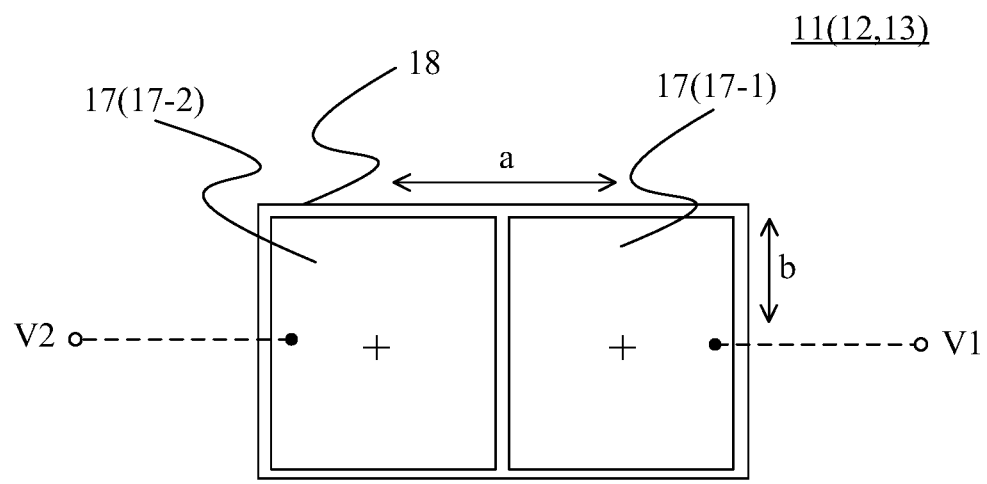
FIG. 3A
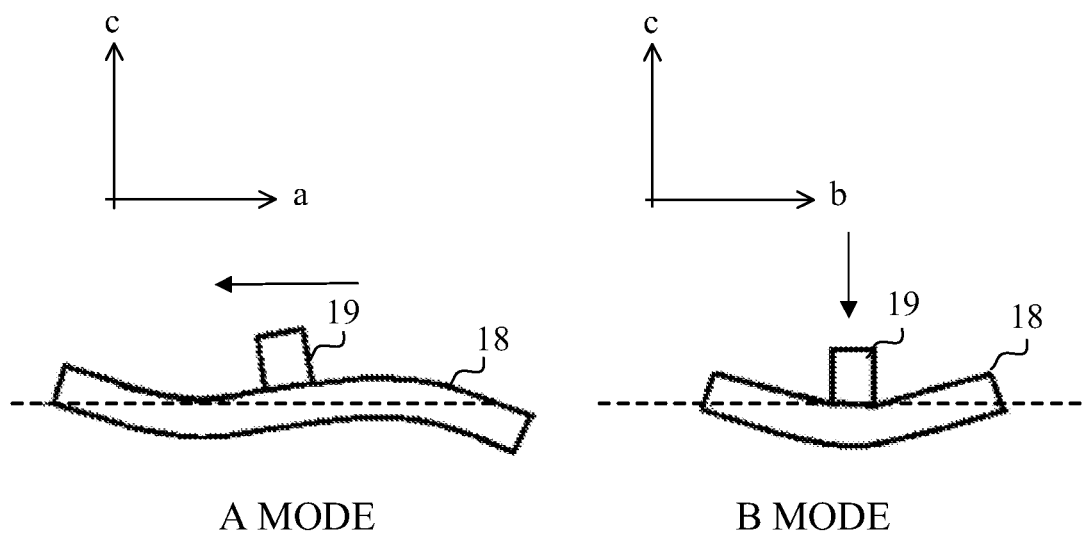
FIG. 3B
FIG. 3C

DRIVING APPARATUS

CROSS-REFERENCE TO RELATED APPLICATIONS

This application is a Continuation of International Patent Application No. PCT/JP2018/030258, filed on Aug. 14, 2018, which claims the benefit of Japanese Patent Application Nos. 2017-163148, filed on Aug. 28, 2017, 2017-163147, filed on Aug. 28, 2017, 2017-163146, filed on Aug. 28, 2017, 2017-163145, filed on Aug. 28, 2017, and 2018-136548, filed on Jul. 20, 2018, each of which is hereby incorporated by reference herein in theif its entirety.

BACKGROUND OF THE INVENTION

Field of the Invention

The present invention relates to a driving apparatus that can drive a mover by a vibrator including an electromechanical energy conversion element.

Description of the Related Art

Conventionally, a structure has been known which applies the voltage to a piezoelectric vibrator to drive a mover in pressure contact with the piezoelectric vibrator. For example, Japanese Patent Laid-Open No. ("JP") 2010-124603 discloses an imaging apparatus in which a mover in pressure contact with a piezoelectric vibrator is formed of a sphere having an imaging unit.

The imaging apparatus disclosed in JP 2010-124603 compresses the piezoelectric vibrator and the mover (sphere) using the magnetic force. However, the pressing structure using the magnetic force may unintentionally fall off the mover (sphere). In addition, even the spherical imaging apparatus disclosed in JP 2010-124603 has difficulties in imaging in a predetermined direction.

SUMMARY OF THE INVENTION

The present invention provides a driving apparatus that can reliably hold a mover with a predetermined pressure.

A driving apparatus according to one aspect of the present invention includes a movable portion, a fixed portion configured to hold the movable portion, and a controller configured to control a position of the movable portion relative to the fixed portion. At least part of the outer surface of the movable portion is a spherical surface. The fixed portion includes a plurality of vibrators configured to press and contact the spherical surface of the movable portion and to rotate the movable portion, and a pressure receiver configured to hold pressure contact states of the plurality of vibrators against the movable portion. The movable portion is held by the plurality of vibrators and the pressure receiver, and a spherical center of the spherical surface of the movable portion is located between a plane passing through the plurality of vibrators and the pressure receiver.

A driving apparatus according to another aspect of the present invention includes a movable portion, a fixed portion configured to hold the movable portion, and a controller configured to control a position of the movable portion relative to the fixed portion. At least part of the outer surface of the movable portion is a spherical surface. The fixed portion includes a plurality of vibrators configured to press and contact the spherical surface of the movable portion and to rotate the movable portion, and a plurality of pressure receivers configured to hold pressure contact states of the plurality of vibrators against the movable portion. The movable portion is held by the plurality of vibrators and the pressure receiver. A spherical center of the spherical surface of the movable portion is located between a plane passing through the plurality of vibrators and a plane passing through the plurality of pressure receivers.

A driving apparatus according to another aspect of the present invention includes a movable portion, a fixed portion configured to hold the movable portion, a controller configured to control a position of the movable portion relative to the fixed portion, and a position detector including an image sensor, and configured to detect a position of the movable portion. The image sensor acquires different luminance information depending on the position of the movable portion based on surface information of the movable portion.

Further features of the present invention will become apparent from the following description of exemplary embodiments with reference to the attached drawings.

BRIEF DESCRIPTION OF THE DRAWINGS

FIGS. 3A to 3C explain a driving principle of a vibrator according to the first embodiment.

DESCRIPTION OF THE EMBODIMENTS

Referring now to the accompanying drawings, a detailed description will be given of embodiments according to the present invention.

First Embodiment

Figure 1:
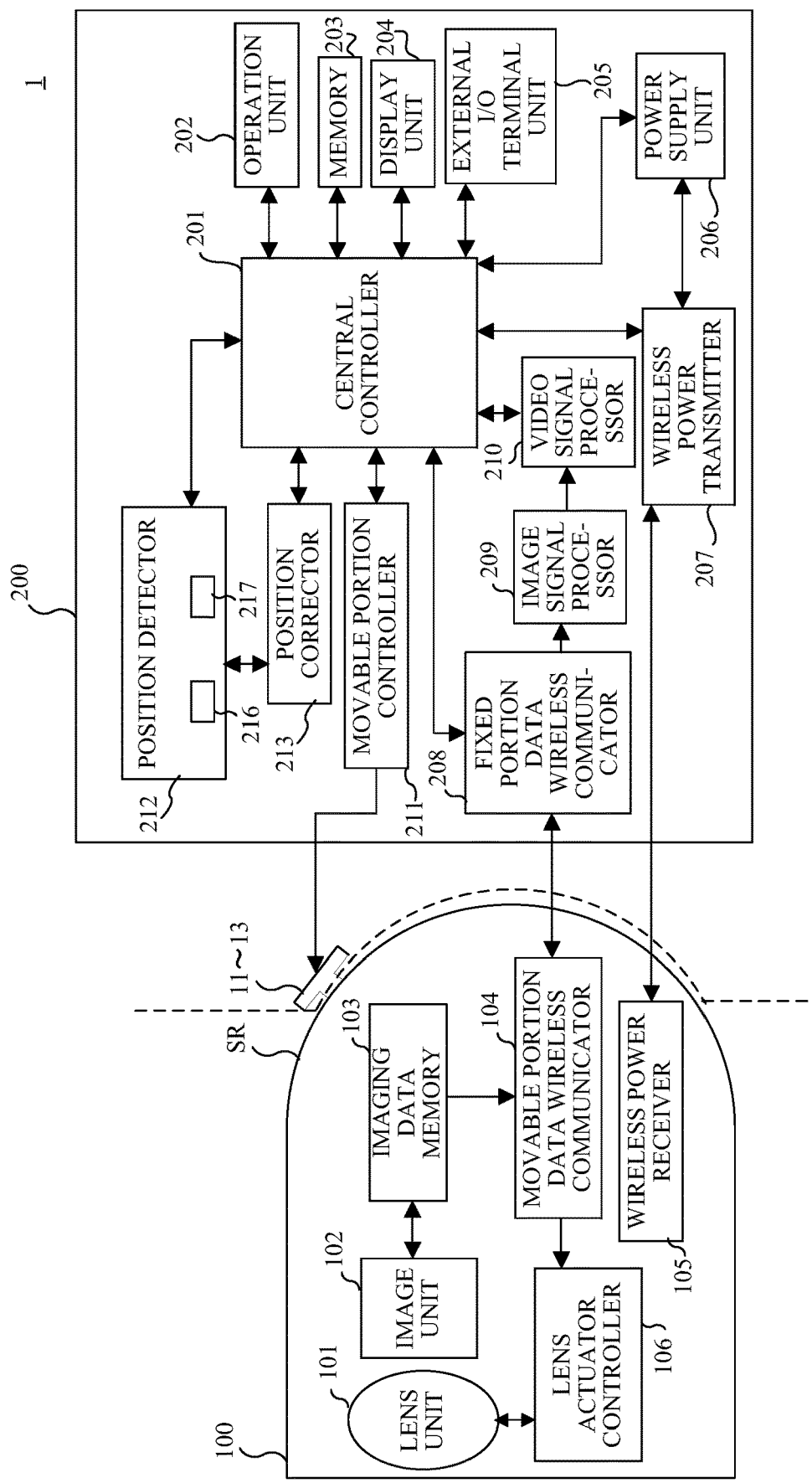
FIG. 1 is a block diagram of an imaging apparatus according to a first embodiment.

Referring now to FIG. 1, a description will be given of an internal configuration and functions of an imaging apparatus (image pickup apparatus), which is a driving apparatus according to a first embodiment of the present invention. FIG. 1 is a block diagram of an imaging apparatus 1 according to this embodiment. In FIG. 1, reference numeral 100 denotes a movable portion including a lens unit 101 and an imaging unit 102, and reference numeral 200 denotes a fixed portion that holds the movable portion 100. The fixed portion 200 includes a central controller (CPU) 201 that controls driving of the movable portion 100 and the entire imaging apparatus 1. At least part of the outer surface of the movable portion 100 is a spherical surface (spherical shape) SR. A plurality of vibrators (vibration wave motors) 11 to 13 including a piezoelectric element 17 (see FIG. 3) are provided on the fixed portion 200 so as to (compressively) contact the spherical surface SR of the movable portion 100.

A description will now be given of the configuration of the movable portion 100. The lens unit 101 includes an imaging optical system including a zoom unit, a diaphragm (aperture stop)/shutter unit, a focus unit, and the like. The imaging unit 102 includes an image sensor, such as a CMOS sensor or a CCD sensor, and photoelectrically converts an optical image (object image) formed via the imaging optical system (lens unit 101) to output an electric signal (imaging data). An imaging data memory 103 stores imaging data output from the imaging unit 102, and transfers the stored imaging data to the movable portion data wireless communicator 104. The movable portion data wireless communicator 104 includes a transmission/reception antenna, and performs a wireless data communication between the movable portion 100 and the fixed portion 200. In transmitting the imaging data output from the imaging unit 102 to the fixed portion 200 by the wireless communication, the imaging data is transmitted in a chronological order of the imaging data stored in the imaging data memory 103.

A lens actuator controller 106 includes a motor driver IC and drives a variety of actuators in the lens unit 101, such as the zoom unit, the diaphragm/shutter unit, and the focus unit. The variety of actuators are driven based on an actuator drive instruction signal of the lens unit 101 received from the fixed portion 200 via the movable portion data wireless communicator 104. A wireless power receiver 105 receives the power from the fixed portion 200 and supplies the received power as a power source for the entire movable portion 100 (each element) according to the application.

A description will now be given of the configuration of the fixed portion 200. The central controller 201 is a controller (CPU) that controls the entire imaging apparatus 1. A fixed portion data wireless communicator 208 performs a wireless data communication between the movable portion 100 and the fixed portion 200 such as a reception of imaging data of the imaging unit 102 in the movable portion 100 and transmissions of various actuator drive instruction signals of the lens unit 101. The imaging signal processor 209 converts an electric signal (imaging data) of the imaging unit 102 output from the fixed portion data wireless communicator 208 into a video signal. The video signal processor 210 processes the video signal output from the imaging signal processor 209 according to the application. The processing of the video signal includes an image stabilization operation by image cutting and rotation processing.

An operation unit 202 is provided for operating the imaging apparatus 1. A memory 203 stores various data such as video information obtained by imaging. A display unit 204 includes a display such as an LCD, and displays an image as necessary based on the signal output from the video signal processor 210. An external input/output (I/O) terminal unit 205 inputs and outputs a communication signal and a video signal to/from an external device. A power supply unit 206 supplies the power to the entire imaging apparatus 1 (each element) according to the application. The wireless power transmitter 207 transmits the power to the movable portion 100. A position detector 212 includes a light source (irradiation light source) 216 and an image sensor 217, and detects the position of the movable portion 100. The light source 216 is provided in a predetermined area of the fixed portion 200.

The central controller 201 controls the position (orientation) of the movable portion 100 by operating the plurality of vibrators 11 to 13 using the movable portion controller 211 based on information from the position detector 212. The movable portion controller 211 applies the voltage to each of the piezoelectric elements in the vibrators 11 to 13 to move (displace) the movable portion 100. By partially or entirely operating the vibrators 11 to 13 as appropriate by the movable portion controller 211, it is possible to realize multi-freedom degrees driving of the movable portion 100. A position corrector 213 corrects the detection position of the movable portion 100 when the image information acquired by the position detector 212 includes the position information of the movable portion 100 (a mark indicating the position information).

This embodiment supplies the power wirelessly from the fixed portion 200 to the movable portion 100, but the power may be supplied by wire. While the data transmission and reception of control signals and imaging data between the fixed portion 200 and the movable portion 100 are performed by the wireless communication, the communication may be made by wire.

Figure 2:
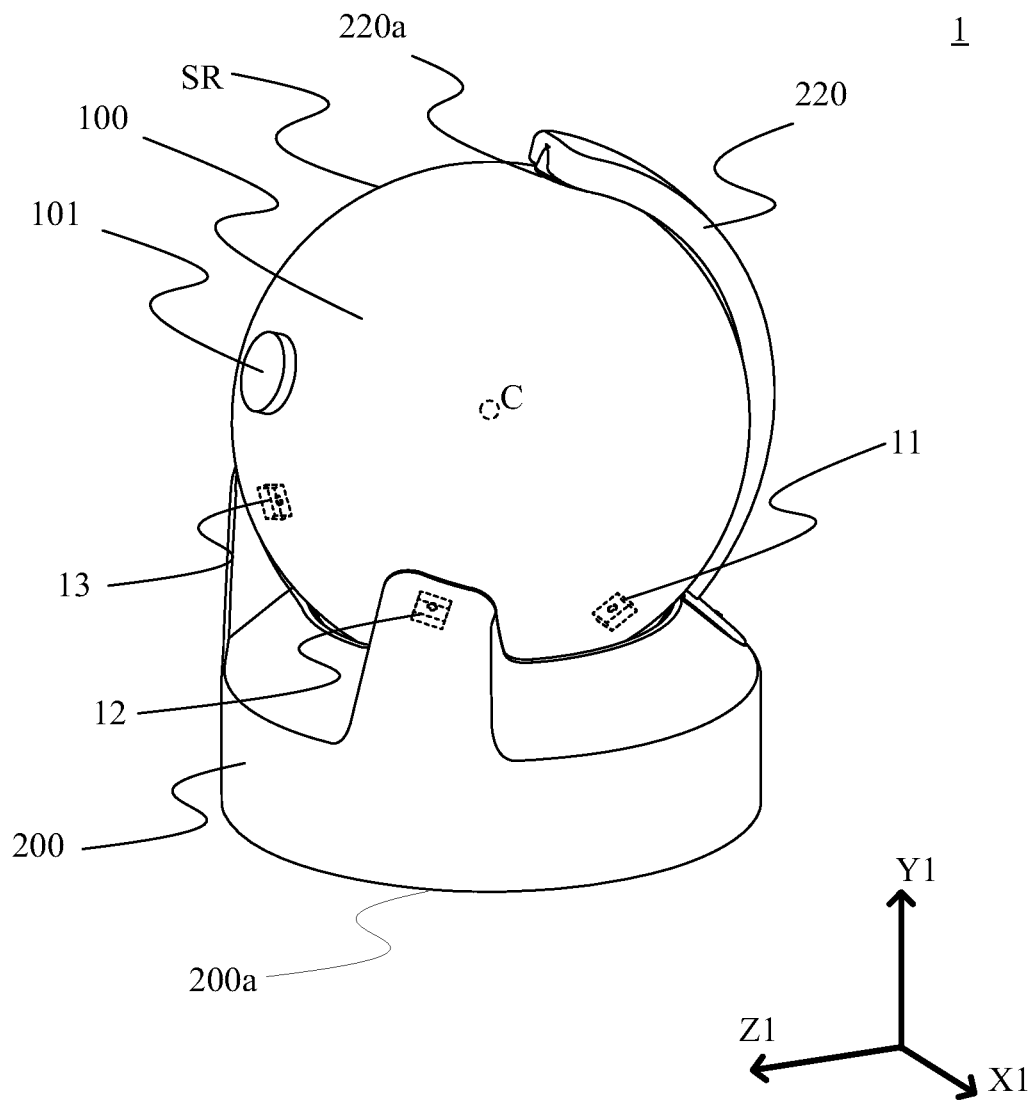
FIG. 2 is an external perspective view of the imaging apparatus according to the first embodiment.

Referring now to FIG. 2, a description will be given of the external configuration of the imaging apparatus 1. FIG. 2 is an external perspective view of the imaging apparatus 1. The movable portion 100 has a spherical surface (spherical shape) in which the lens unit 101 (lens unit) is incorporated. The movable portion 100 is sandwiched between the plurality of vibrators 11 to 13 provided to the fixed portion 200 and a pressure receiver 220a provided at the tip of an arm portion 220 connected to the fixed portion 200. In this embodiment, for description convenience, a bottom surface 200a of the fixed portion 200 is defined by an X1 axis and a Z1 axis orthogonal to each other, and an axis orthogonal to each of the X1 axis and the Z1 axis is defined as a Y1 axis.

The vibrators 11 to 13 are fixed onto the fixed portion 200 via an unillustrated spring member so as to be biased toward a spherical center C of the movable portion 100. The pressure receiver 220a receives biasing forces of the movable portion 100 by the spring members. That is, each of the vibrators 11 to 13 is disposed in pressure contact with the spherical surface SR of the movable portion 100 (pressure contact state). When a driving force (electrical signal for driving) is applied to each of the vibrators 11 to 13 by the movable portion controller 211, the movable portion 100 is frictionally driven at the respective contact points (contact sections) of the vibrators 11 to 13. The movable portion 100 can be moved around an arbitrary axis passing through the spherical center C due to the resultant force. Due to this structure, the imaging apparatus 1 can move the movable portion 100 having the lens unit 101 relative to the fixed portion 200, and consequently capture images in various directions and angles.

Referring now to FIGS. 3A to 3C, a description will be given of the driving principle of the vibrators (vibration wave motors) 11 to 13. FIGS. 3A to 3C explain the driving principle of the vibrators 11 to 13. In this embodiment, each of the vibrators 11 to 13 includes a vibrating plate 18 and a piezoelectric element 17 as an electromechanical energy conversion element attached to the back surface of the vibrating plate 18.

FIG. 3A illustrates an electrode pattern of the piezoelectric element 17 attached to the back surface of the vibrating plate 18, and equally divided electrode areas 17-1 and 17-2 are formed in the longitudinal direction ("a" direction). The polarization directions of the electrode areas 17-1 and 17-2 are the same ("+") direction. Of the two electrode areas 17-1 and 17-2 in the piezoelectric element 17, the AC voltage V1 is applied to the electrode area 17-1 located on the right side in FIG. 3A. The AC voltage V2 is applied to the electrode area 17-2 located on the left side in FIG. 3A. FIG. 3A assumes that the AC voltages V1 and V2 are AC voltages near the A-mode resonance frequency and have phases that shift from each other by 180°. At this time, at a certain moment, the right electrode area 17-1 in the piezoelectric element 17 contracts, and the left electrode area 17-2 expands. At another moment, this relationship is reversed. As a result, the A-mode vibration is generated on the vibrating plate 18 as illustrated in FIG. 3B. The A mode is a secondary bending mode in the direction of the arrow a, which has three nodes with small displacements in "c" direction and has two abdominal portions with large displacements in the "c" direction. This vibration displaces the tip of the protrusion 19 provided at the center of the vibrating plate 18 in the lateral direction in FIG. 3B. The protrusion 19 is a contact portion that contacts the movable portion 100 on the back side of FIG. 3C On the other hand, when the AC voltages V1 and V2 are set to frequencies near the B-mode resonance frequency and AC voltages having the same phase, the entire piezoelectric element 17 (two electrode areas 17-1 and 17-2) expands at one moment and shrinks at another. As a result, the vibration in the B mode occurs in the vibrating plate 18 as illustrated in FIG. 3B. The B mode is a primary-order bending mode in "b" direction, and has two nodes having small displacements in the "c" direction and one abdomen having a large displacement in the "c" direction. At this time, the "A-mode resonance frequency" and the "B-mode resonance frequency" are set to approximately the same frequencies. The approximate coincidence means not only strict coincidence, but also substantial coincidence to the extent of being determined to be equal to each other.

By combining such vibrations with a certain temporal phase relationship, an elliptical motion having diameters in the "a" and "c" directions is generated at the tip of the protrusion 19 in contact with the movable portion 100. Then, the movable portion 100 receives this elliptical motion as frictional forces of the vibrators 11 to 13 and is driven in the arrow direction in FIG. 3B. The generation ratio between the A mode and the B mode can be changed by changing the voltage phase difference input to the equally divided electrode areas 17-1 and 17-2 in the piezoelectric element 17, and the ellipse can also be changed according to the generation ratio between the A mode and the B mode. By changing the generation ratio between the A mode and the B mode in the vibrators 11 to 13, the driving force of the contact portion can be changed and the speed of the movable portion can be controlled.

Figure 4:
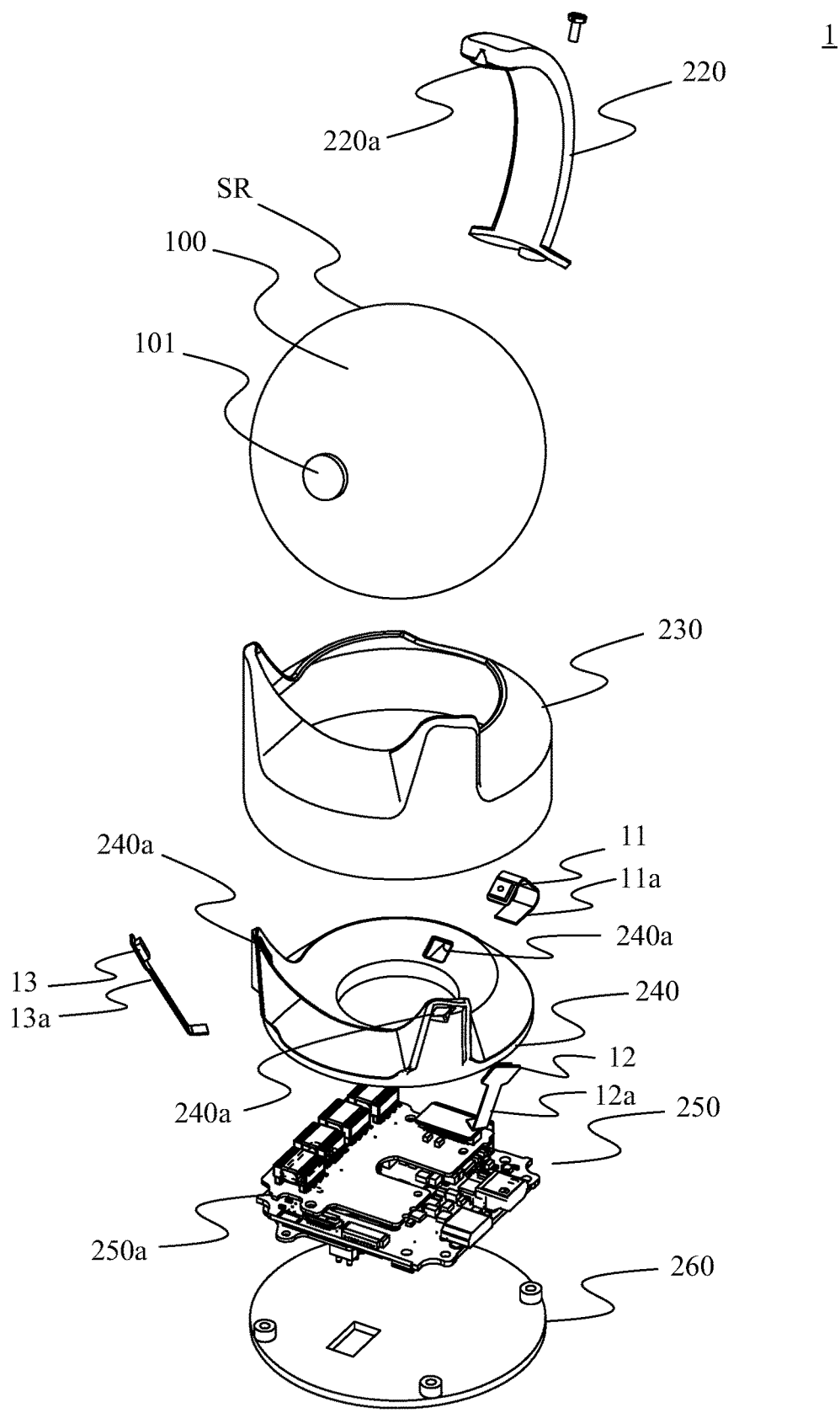
FIG. 4 is an exploded perspective view of the imaging apparatus according to the first embodiment.

Referring now to FIG. 4, a description will be given of the configuration of the imaging apparatus 1. FIG. 4 is an exploded perspective view of the imaging apparatus 1. The imaging apparatus 1 mainly includes the movable portion 100 including the lens unit 101, and the fixed portion 200 including the arm unit 220, a base cover 230, a chassis 240, an internal structure 250, and a bottom cover 260. The internal structure 250 has a control board 250a. The control board 250a includes the central controller (CPU) 201, the memory 203, and the movable portion controller 211 that controls driving of the movable portion 100, and the entire operation of the imaging apparatus 1. After the internal structure 250 is fixed inside the base cover 230 via the chassis 240, the bottom cover 260 is fixed onto the lower part of the base cover 230 and the internal structure 250 is cased.

The vibrators 11 to 13 are actuators called ultrasonic motors, which employ ultrasonic vibration to frictionally drive the driven member. Each of the vibrators 11 to 13 is disposed so as to expose to the movable portion 100 side from an opening 240a in the chassis 240, and is fixed onto the chassis 240 via the unillustrated spring member so that a biasing force acts toward the spherical center C of the movable portion 100. FPCs (flexible printed circuit boards) 11a, 12a, and 13a extending from the vibrators 11 to 13 are electrically connected to the control board 250a, respectively. The FPCs 11a, 12a, and 13a can apply an arbitrary high-frequency voltage to each of the piezoelectric elements 17 (electromechanical energy conversion elements) in the vibrators 11 to 13 in response to a control signal from the movable portion controller 211. The position detector 212 is fixed onto the chassis 240 via an unillustrated fixing member so as to capture the surface of the movable portion 100 without preventing the movable portion 100 from being driven.

The arm portion 220 is fixed onto the chassis 240 by a fastening member such as a screw so that the pressure receiver 220a provided at the tip thereof contacts the spherical surface SR of the movable portion 100. Thus, the pressure receiver 220a receives the respective biasing forces from the vibrators 11 to 13 and the vibrators 11 to 13 can maintain the pressure contact states with the movable portion 100. The pressure receiver 220a is made of a resin (such as polyacetal) or a rolling member having a low friction and excellent slidability in order to reduce the friction when the movable portion 100 is rotationally driven.

Figure 5A:
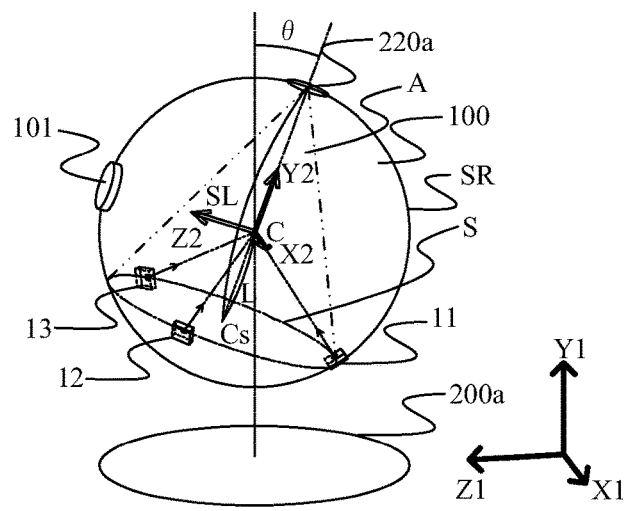
FIGS. 5A to 5D explain the imaging apparatus according to the first embodiment.

Referring now to FIGS. 5A to 5D, a description will be given of a relationship among the fixed portion 200, the movable portion 100, the vibrators 11 to 13, and the pressure receiver 220a. FIGS. 5A to 5D explain the imaging apparatus 1. FIG. 5A illustrates only the bottom surface 200a of the fixed portion 200, the movable portion 100, the vibrators 11 to 13, and the pressure receiver 220a in the imaging apparatus 1. For description convenience, at the spherical center C of the movable portion 100, a coordinate system made by rotating the first coordinate system (X1, Y1, and Z1 axes) around the X1 axis by an angle θ will be set to as a second coordinate system (X2 axis, Y2 axis, Z2 axis).

Figure 5B:
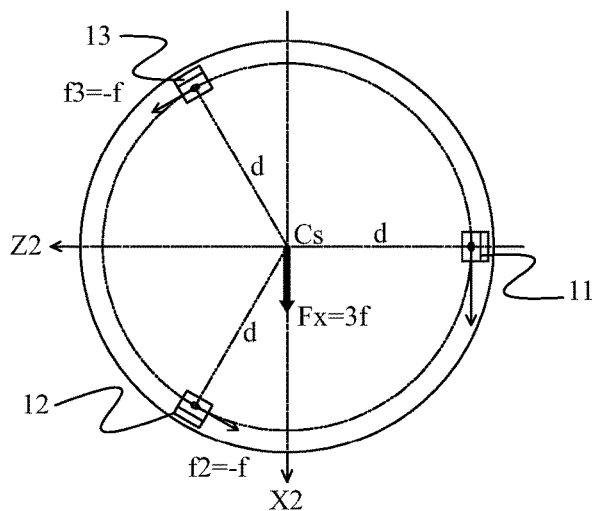
Figure 5C:
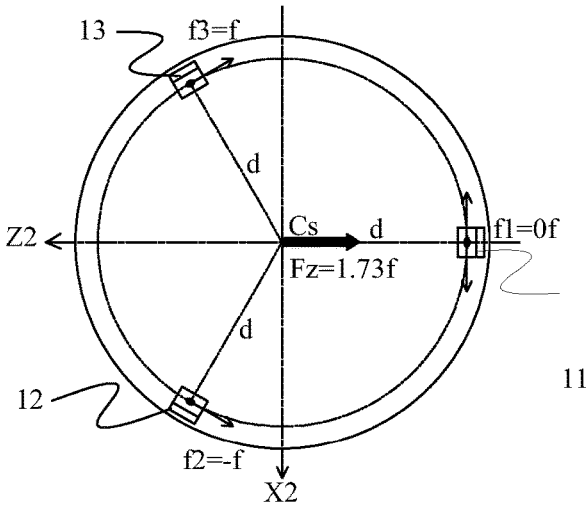
Figure 5D:
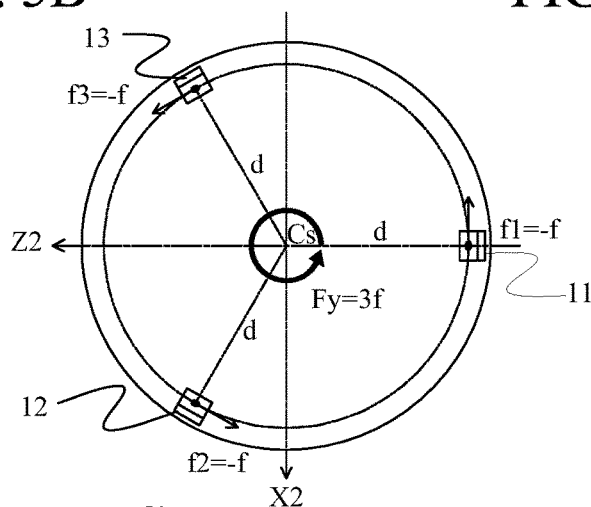

FIGS. 5B to 5D are figures viewed from the Y2 axis direction. As illustrated in FIGS. 5A to 5D, the vibrators 11 to 13 are disposed at 120° intervals on the circumference of an intersection circle (small circle) S that is made between one of the planes perpendicular to the Y2 axis (planes defined by the X2 axis and the Z2 axis) which is distant from the spherical center C by a distance L and the spherical center S. Each of the vibrators 11 to 13 is biased toward the spherical center C of the movable portion 100 via the unillustrated spring member. The spherical center C of the spherical surface SR of the movable portion 100 is located in the area A formed by connecting each point on the circumference of the circle (intersection circle or small circle S) passing through the plurality of vibrators 11 to 13 and the pressure receiver 220a to one another. In other words, the spherical center C of the spherical surface SR of the movable portion 100 is located between the plane passing through the plurality of vibrators 11 to 13 and the pressure receiver 220a. The plane passing through the plurality of vibrators includes the plane passing through any three of the plurality of vibrators when there are more than four vibrators. A virtual straight line SL connecting the pressure receiver 220a and the center Cs of the intersection circle (small circle) S passes through the sphere center C of the movable portion 100 and is perpendicular to the intersection circle (small circle) S (or parallel to the Y2 axis). This structure can effectively maintain the pressed contact states of the vibrators 11 to 13 against the movable portion 100, and surely holds the movable portion 100 to prevent the movable portion 100 from inadvertently falling off.

Next follows a description of the rotation operation of the movable portion 100. FIG. 5B illustrates a state when the movable portion 100 is actually rotated about the Z2 axis. As illustrated in FIGS. 5A to 5D, the vibrators 11 to 13 are disposed by a distance d from the Y2 axis at 120° intervals. Assume that the clockwise force is positive. Then, when each of them generates a positive force, the direction of the force of the vibrator 11 is 0° relative to the X2 axis direction, the direction of the force of the vibrator 12 is 240°, and the direction of the force of the vibrator 13 is 120°. The protrusions (contact portions) 19 are provided on the vibrators 11 to 13, respectively, so that the protrusions 19 of the vibrators 11 to 13 contact the spherical surface SR of the movable portion 100 at three points. Due to the three-point contact configuration using the three protrusion 19, each of the vibrators 11 to 13 can stably contact the spherical surface SR.

In FIG. 5B, f1=2×f, f2=−f, and f3=−f are met where f1 is a force applied to the vibrator 11 to rotate the movable portion 100 around the Z2 axis, f2 is a force applied to the vibrator 12, and f3 is a force applied to the vibrator 13, and f is a predetermined force. Where Fx is a force in the X2 direction, Fz is a force in the Y2 direction, Fy is a force in the rotating direction, and d is the distance from the Y2 axis to each of the vibrators 11 to 13, Fx, Fz, and Fx are respectively expressed by the following expressions (1) to (3):

$$Fx = f1 * \cos(0°) + f2 * \cos(240°) + f3 * \cos(120°) = (2 \times f \times 1) + (-f \times -0.5) + (-f \times -0.5) = 3 \times f \quad (1)$$

$$Fz = f1 * \sin(0°) + f2 * \sin(240°) + f3 * \sin(120°) = (2 \times f \times 0) + (-f \times -0.86) + (-f \times 0.86) = 0 \times f \quad (2)$$

$$Fy = f1 * d + f2 * d + f3 * d = (2 \times f \times d) + (-f \times d) + (-f \times d) = 0 \times f \quad (3)$$

Thus, when f1 to f3 are input, only the force Fx is generated as the resultant force in the X2 direction at the center point Cs of the intersection circle (small circle) S. That is, a driving force in only the X2 direction is applied to the movable portion 100. Therefore, the resultant force Fx of the vibrators 11 to 13 can rotate the movable portion 100 around the Z2 axis.

FIG. 5C illustrates a state when the movable portion 100 is actually rotated around the X2 axis. In FIG. 5C, f1=0×f, f2=−f, and f3=+f are met where f is a predetermined force, f1 is a force applied to the vibrator 11 to rotate the movable portion 100 around the X2 axis, f2 is a force applied to the vibrator 12, and f3 is a force applied to the vibrator 13. When an input of the force to the movable portion 100 is considered in the same manner as the rotation around the Z2 axis, Fx, Fz, and Fy are expressed by the following expressions (1a) to (3a), respectively.

$$Fx = f1 * \cos(0°) + f2 * \cos(240°) + f3 * \cos(120°) = (0 \times f \times 1) + (-f \times -0.5) + (f \times -0.5) = 0 \times f \quad (1a)$$

$$Fz = f1 * \sin(0°) + f2 * \sin(240°) + f3 * \sin(120°) = (0 \times f \times 0) + (-f \times -0.86) + (f \times 0.86) = 1.73 \times f \quad (2a)$$

$$Fy = f1 * d + f2 * d + f3 * d = (0 \times f \times d) + (-f \times d) + (f \times d) = 0 \times f \quad (3a)$$

Thus, when f1 to f3 are input, only the force Fz is generated as the resultant force in the −Z2 direction at the center point Cs of the intersection circle (small circle) S. In other words, a driving force in only the −Z2 direction is applied to the movable portion 100. Therefore, the resultant force Fz of the vibrators 11 to 13 can rotate the movable portion 100 around the X2 axis.

FIG. 5D illustrates a state when the movable portion 100 is actually rotated around the Y2 axis. In FIG. 5D, f1=−f, f2=−f, and f3=−f are met where f1 is a force applied to the vibrator 11 to rotate the movable portion 100 around the Y2 axis, f2 is a force applied to the vibrator 12, and f3 is a force applied to the vibrator 13, and f is a predetermined force. At this time, when the input of the force to the movable portion 100 is considered, Fx, Fz, and Fy are respectively represented by the following expressions (1b) to (3b).

$$Fx = f1 * \cos(0°) + f2 * \cos(240°) + f3 * \cos(120°) = (-f \times 1) + (-f \times -0.5) + (-f \times -0.5) = 0 \times f \quad (1b)$$

$$Fz = f1 * \sin(0°) + f2 * \sin(240°) + f3 * \sin(120°) = (-f \times 0) + (-f \times -0.86) + (-f \times 0.86) = 0 \times f \quad (2b)$$

$$Fy = f1 * d + f2 * d + f3 * d = (-f \times d) + (-f \times d) + (-f \times d) = -3 \times f \quad (3b)$$

Thus, when f1 to f3 are input, only a force Fy is generated as a resultant force in the rotating direction around the Y2 axis at the center point Cs of the intersection circle (small circle) S. That is, a driving force only in the rotating direction around the Y2 axis is applied to the movable portion 100. Thus, the resultant force Fy of the vibrators 11 to 13 can rotate the movable portion 100 counterclockwise around the Y2 axis.

By appropriately combining the above rotational movements, the movable portion 100 can be rotated around an arbitrary axis passing through the spherical center C (or the lens unit 101 can be swung in an arbitrary direction). Thereby, imaging in all directions is available and an operation is available for correcting an optical axis shift of the lens unit 101 due to the camera shake or the like.

Figure 6:
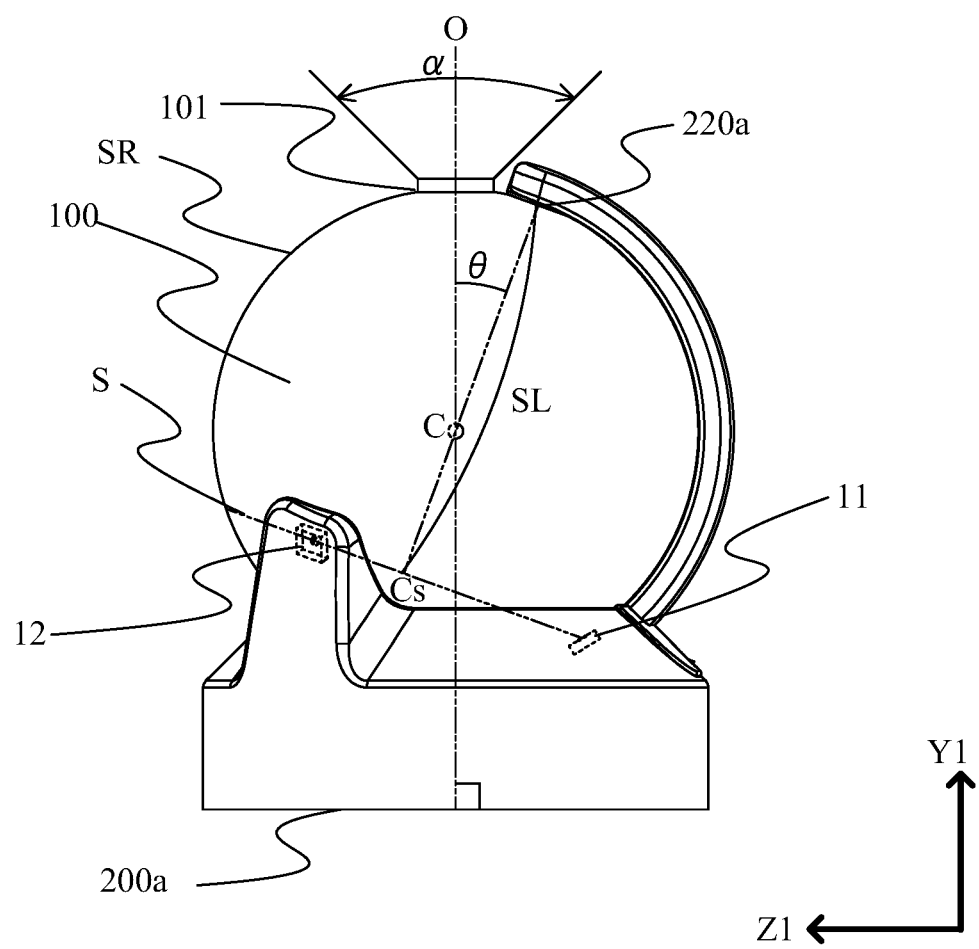
FIG. 6 explains the imaging apparatus according to the first embodiment viewed from an X1 direction.

FIG. 6 illustrates the imaging apparatus 1 viewed from the X1 axis direction. In FIG. 6, the movable portion 100 in the imaging apparatus 1 has moved to a position where the optical axis O of the lens unit 101 is orthogonal to the bottom surface 200a, where α is an imaging range of the lens unit 101 (angle of view of the lens unit 101). As illustrated in FIG. 6, the pressure receiver 220a is located outside the imaging range α of the lens unit 101. By setting this angle θ, the imaging apparatus 1 can perform imaging in a direction orthogonal to the bottom surface 200a. For example, the bottom surface 200a of the imaging apparatus 1 attached to a ceiling can capture an image just under the ceiling.

Second Embodiment

Figure 7A:
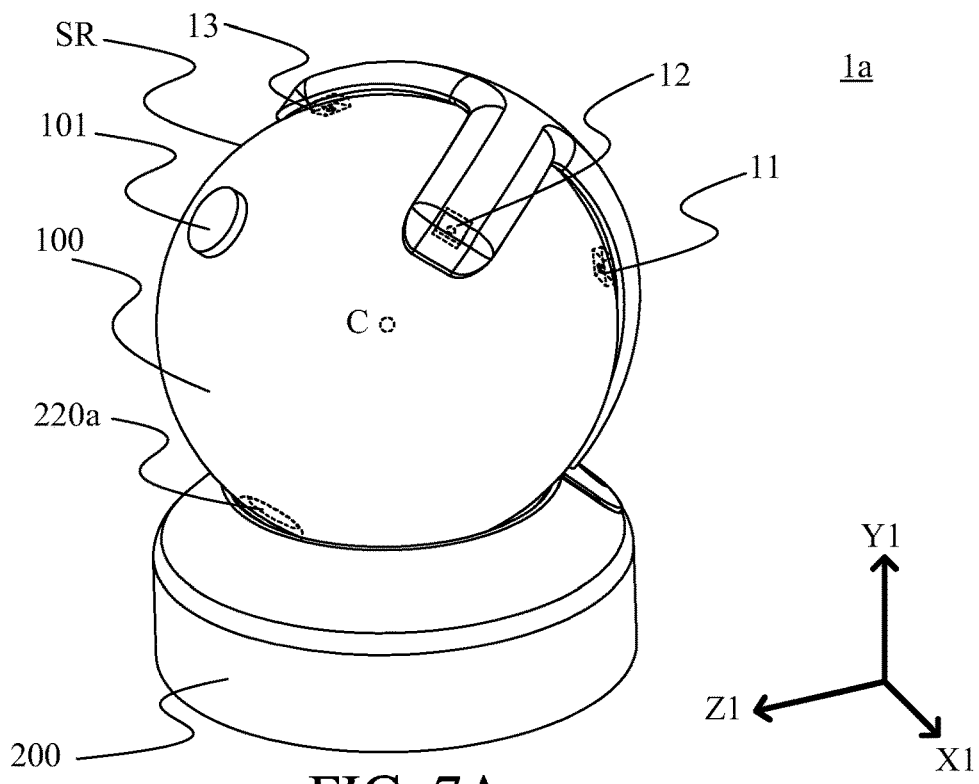
FIGS. 7A and 7B explain an imaging apparatus according to a second embodiment.
Figure 7B:
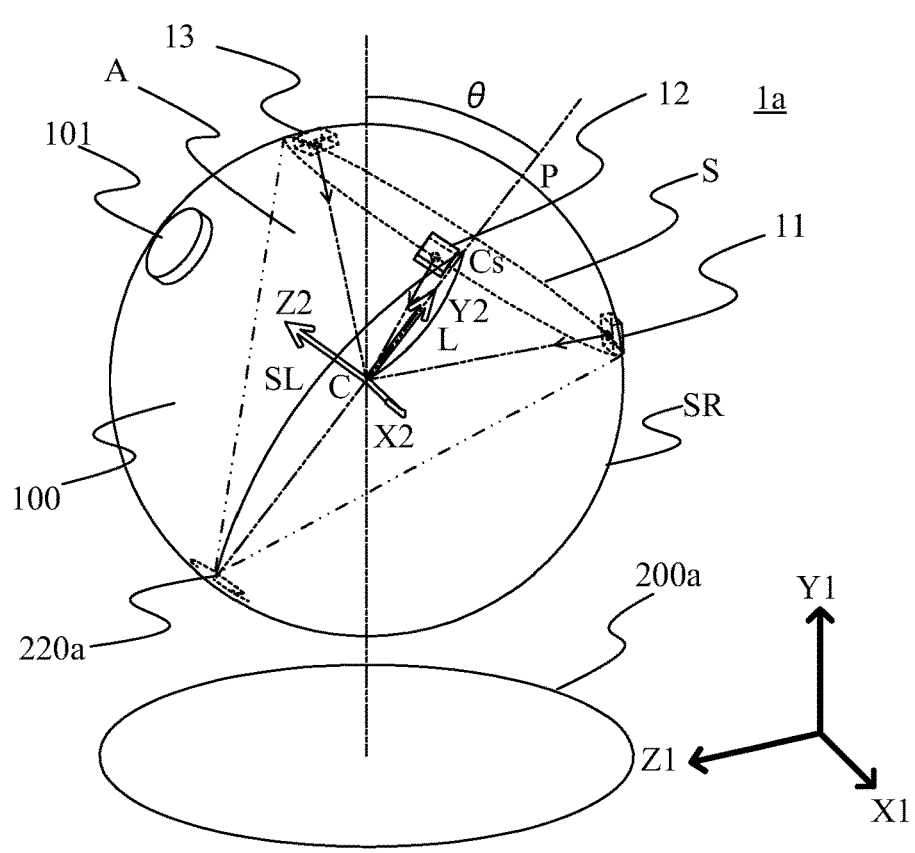

Referring now to FIGS. 7A and 7B, a description will be given of an imaging apparatus according to a second embodiment of the present invention. FIGS. 7A and 7B explain the imaging apparatus 1a according to this embodiment. Those elements which are corresponding elements in the imaging apparatus 1 of the first embodiment will be designated by the same reference numerals, and a description thereof will be omitted.

FIG. 7A is an external perspective view of the imaging apparatus 1a. The movable portion 100 has a spherical shape in which the lens unit 101 is incorporated. The movable portion 100 is sandwiched between the pressure receiver 220a provided on the fixed portion 200 and the plurality of vibrators 11 to 13 provided on the arm portion 220 connected to the fixed portion 200. Each of the vibrators 11 to 13 is fixed inside the arm portion 220 via the unillustrated spring member so as to be biased toward the spherical center C of the movable portion 100. The pressure receiver 220a receives the biasing force of each of the plurality of vibrators 11 to 13. That is, each of the vibrators 11 to 13 is disposed in pressure contact with the spherical surface SR of the movable portion 100.

Referring now to FIG. 7B, a description will be given of a relationship among the movable portion 100, the fixed portion 200, the vibrators 11 to 13, and the pressure receiver 220a. FIG. 7B illustrates only the bottom surface 200a of the fixed portion 200, the movable portion 100, the vibrators 11 to 13, and the pressure receiver 220a in the imaging apparatus 1. For description convenience, a coordinate system obtained by rotating the first coordinate system (X1, Y1, and Z1 axes) around the X1 axis by an angle θ at the spherical center C of the movable portion 100 will be referred to as a second coordinate system (X2 axis, Y2 axis, Z2 axis).

As illustrated in FIG. 7B, the vibrators 11 to 13 are arranged at 120° intervals on the circumference of an intersection circle (small circle) S that is made between one of the planes perpendicular to the Y2 axis (planes defined by the X2 axis and the Z2 axis) which is distant from the spherical center C by the distance L and the spherical surface SR. Each of the vibrators 11 to 13 is biased toward the spherical center C of the movable portion 100 via the unillustrated spring member. The movable portion 100 can rotate in the same manner as in the method described in the first embodiment. As illustrated in FIG. 7B, the spherical center C of the movable portion 100 is located inside an area A that is formed by connecting each point on the circumference of the intersection circle (small circle) S and the pressure receiver 220a. A virtual straight line SL connecting the pressure receiver 220a and the center Cs of the intersection circle (small circle) S passes through the sphere C of the movable portion 100 and is perpendicular to the intersection circle (small circle) S (or parallel to the Y2 axis). The angle θ is set such that the intersection P between the virtual straight line SL and the spherical surface SR is located outside the imaging range α of the lens unit 101. This configuration can provide the same effect as that of the first embodiment.

Third Embodiment

Figure 8A:
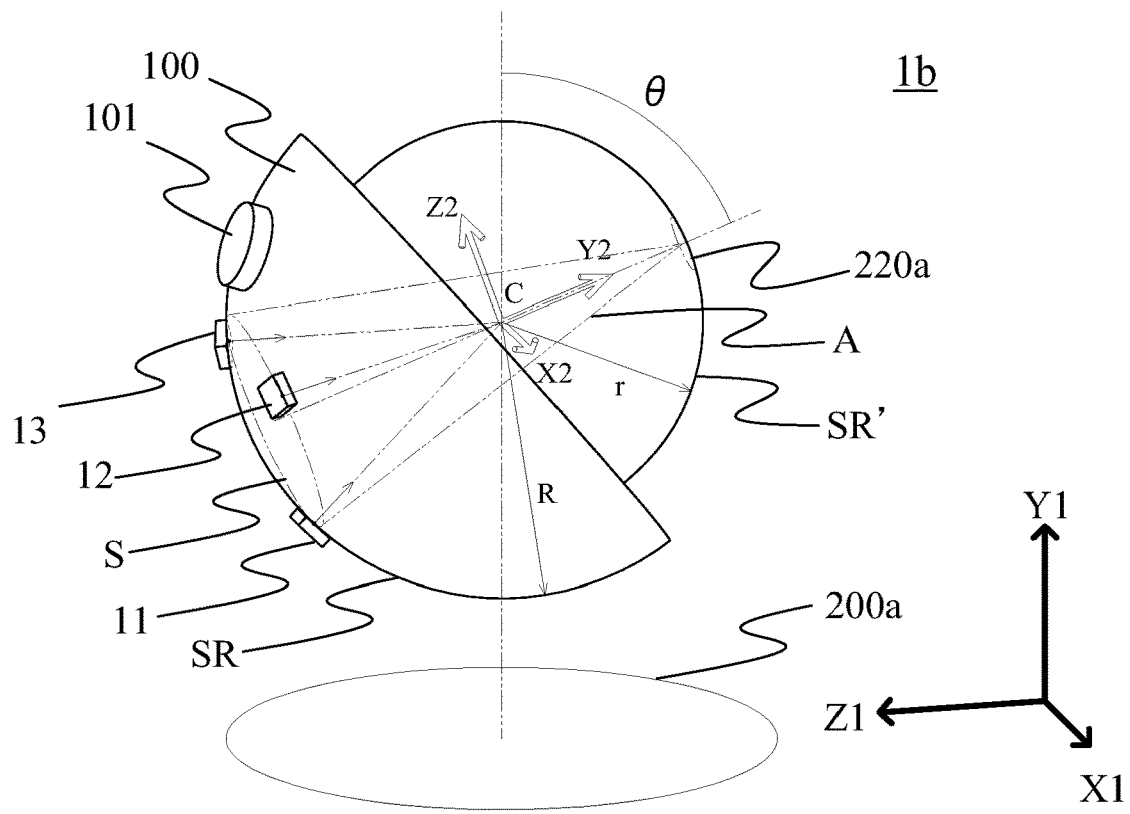
FIGS. 8A and 8B explain an imaging apparatus according to a third embodiment.
Figure 8B:
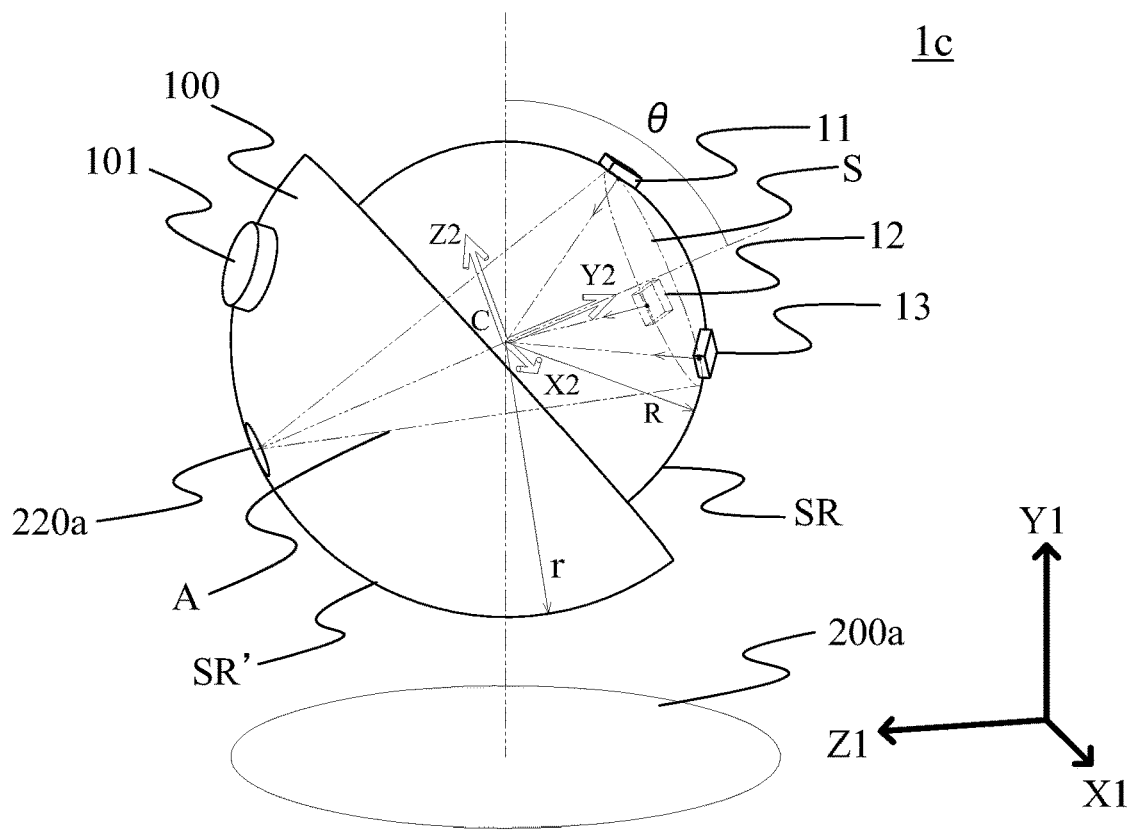

Referring now to FIGS. 8A and 8B, a description will be given of an imaging apparatus according to a third embodiment of the present invention. FIGS. 8A and 8B explain imaging apparatuses 1b and 1c according to this embodiment. Those elements, which are corresponding elements in the imaging apparatus 1 described in the first embodiment, will be designated by the same reference numerals, and a description thereof will be omitted.

As illustrated in FIGS. 8A and 8B, in this embodiment, the pressure receiver 220a contacts a spherical surface SR' different from the spherical surface SR which the plurality of vibrators 11 to 13 contact. In other words, the spherical surface SR which the vibrators 11 to 13 contact and the spherical surface SR' which the pressure receiver 220a contact are different from each other. Where R is a radius of the spherical surface SR and r is a radius of the spherical surface SR', R is not equal to r (R≠r). R and r may satisfy any one of R>r in the imaging apparatus 1b illustrated in FIG. 8A and R<r in the imaging apparatus 1c illustrated in FIG. 8B. The above structure can provide the same rotation operation as that of the first embodiment and reduce the size of the imaging apparatus.

Fourth Embodiment

Figure 9:
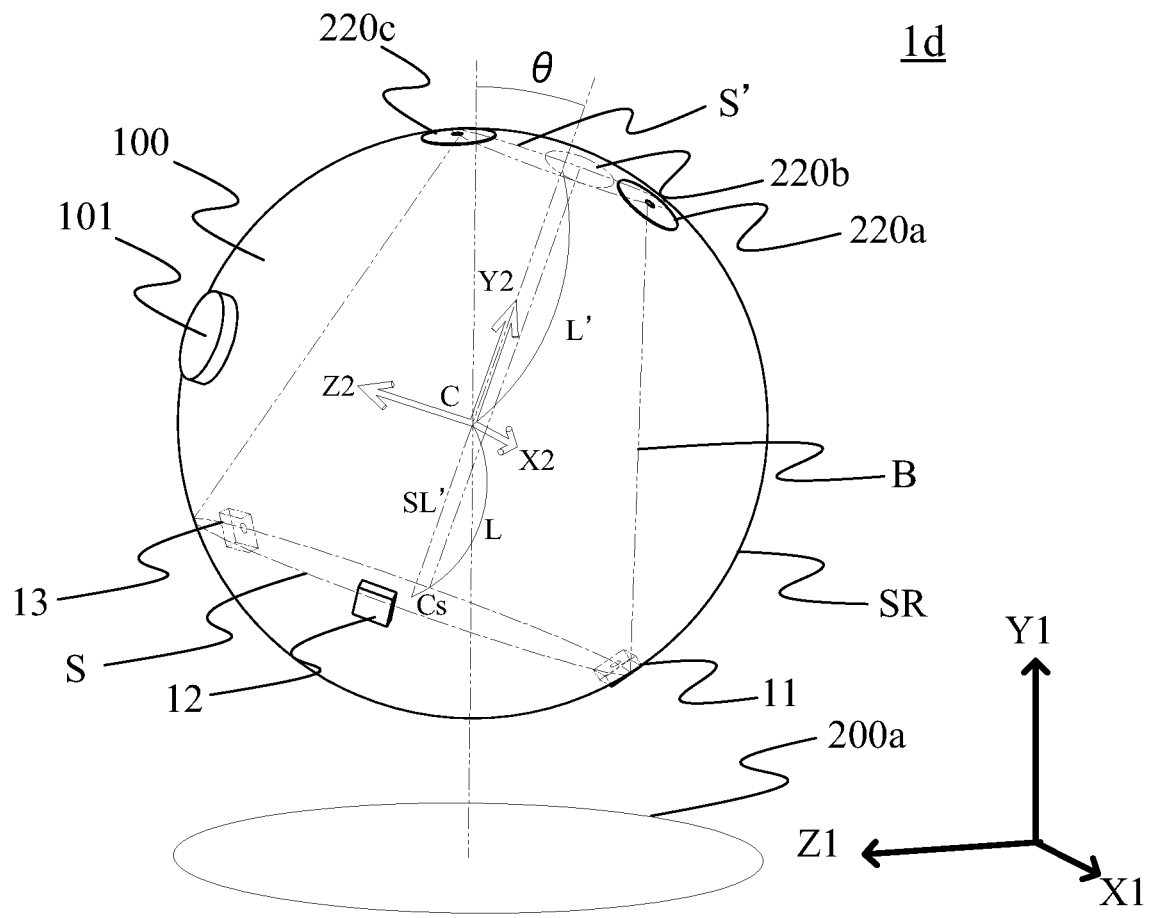
FIG. 9 explains an imaging apparatus according to a fourth embodiment.

Referring now to FIG. 9, a description will be given of an imaging apparatus according to a fourth embodiment of the present invention. FIG. 9 explains an imaging apparatus 1d according to this embodiment. Those elements, which are corresponding elements in the imaging apparatus 1 described in the first embodiment, will be designated by the same reference numerals, and a description thereof will be omitted.

As illustrated in FIG. 9, the imaging apparatus 1d according to this embodiment includes a plurality of pressure receivers 220a to 220c. The movable portion 100 is sandwiched between each of the plurality of pressure receivers 220a to 220c and each of the plurality of vibrators 11 to 13. The pressure receivers 220a to 220c are arranged at 120° intervals on the circumference of an intersection circle (small circle) S' that is formed between one of planes perpendicular to the Y2 axis (planes defined by the X2 axis and the Z2 axis) which is distant from the spherical center C by a distance L' and the spherical surface SR. On the other hand, the vibrators 11 to 13 are arranged at 120° intervals on the circumference of the intersection circle (small circle) S that is made between one of the planes perpendicular to the Y2 axis (planes defined by the X2 axis and the Z2 axis) which is distant from the spherical center C by the distance L in a direction opposite to the pressure receiver and the spherical surface SR. In other words, the intersection circle (small circle) S' defined by the plurality of pressure receivers 220a to 220c and the intersection circle (small circle) S defined by the plurality of vibrators 11 to 13 sandwich the spherical center C and are approximately parallel to each other. The positional relationship is substantially parallel to each other. As illustrated in FIG. 9, the spherical center C of the movable portion 100 (spherical surface SR) is located inside an area B that is formed by connecting each point on the circumference of the intersection circle (small circle) S and each point on the circumference of the intersection circle (small circle) S'. An imaginary straight line SL' connecting the spherical center C of the movable portion 100 and the center Cs of the intersection circle (small circle) S passes through the inside of the intersection circle (small circle) S' and is approximately perpendicular to the intersection circle (small circle) S' (or parallel to the Y2 axis). The above configuration can provide the same rotational operation as that of the first embodiment, corrects the plurality of pressure receivers 220a to 220c, and can effectively adjust the pressure contact states of the vibrators 11 to 13 against the movable portion 100.

Thus, in the first to fourth embodiments, the spherical center C of the spherical surface SR of the movable portion 100 is located inside the area A that is formed by connecting the points on the circumference of the intersection S passing through each of the plurality of vibrators 11 to 13 and the pressure receiver 220a. A virtual straight line SL connecting center Cs of intersection circle S and the pressure receiver 220a may have a predetermined angle θ (≠0) relative to the normal to the bottom surface 200a of fixed portion 200. When the optical axis O of the lens unit 101 is orthogonal to the bottom surface 200a of the fixed portion 200, the intersection (220a, P) between the virtual straight line SL and the spherical surface SR may be located outside the range of the angle of view of the lens unit 101.

The spherical center C of the spherical surface SR of the movable portion 100 may be located inside the area B formed by connecting each point on the circumference of the intersection circle S passing through each of the plurality of vibrators 11 to 13 and the plurality of pressure receivers 220a to 220c. In other words, the spherical center C of the spherical surface SR of the movable portion 100 is located between the plane passing through the plurality of vibrators 11 to 13 and the plane passing through the plurality of pressure receivers 220a to 220c. When there are more than four vibrators, the planes passing through the plurality of vibrators include a plane passing through any three of the plurality of vibrators. When there are more than four pressure receivers, the planes passing through the plurality of pressure receivers include the plane passing any three of the plurality of pressure receivers. A virtual straight line SL' connecting the center Cs of a circle (intersection circle S) passing through each of the plurality of vibrators 11 to 13 and the spherical center C of the spherical surface SR may pass inside the circle (intersection circle S') that passes each of the plurality of pressure receivers 220a to 220c.

The first to fourth embodiments can provide an imaging apparatus that can widen an imaging direction (release the restriction on the imaging direction) while reliably holding a moving body with a predetermined pressing force.

Fifth Embodiment

Next follows a description of an imaging apparatus according to a fifth embodiment of the present invention. The basic configuration of the imaging apparatus according to this embodiment is the same as that of the imaging apparatus 1 in the first embodiment descried with reference to FIGS. 1 to 6, and thus a description thereof will be omitted.

Figure 10A:
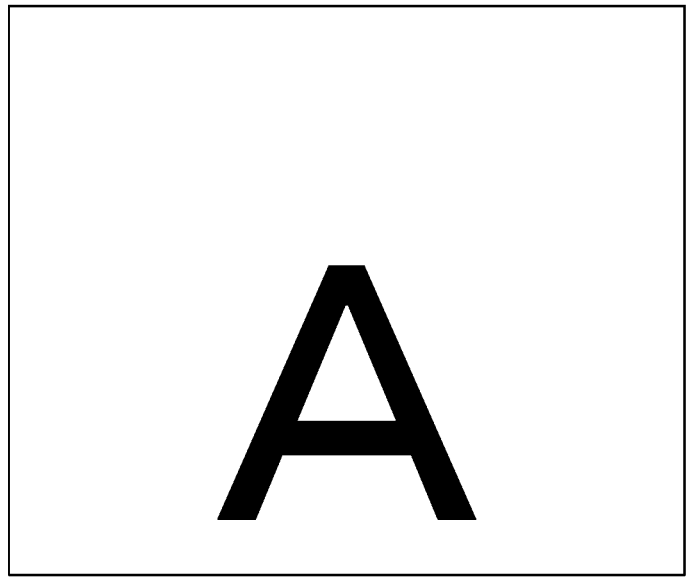
FIGS. 10A and 10B explain a position detecting method according to a fifth embodiment.
Figure 10B:
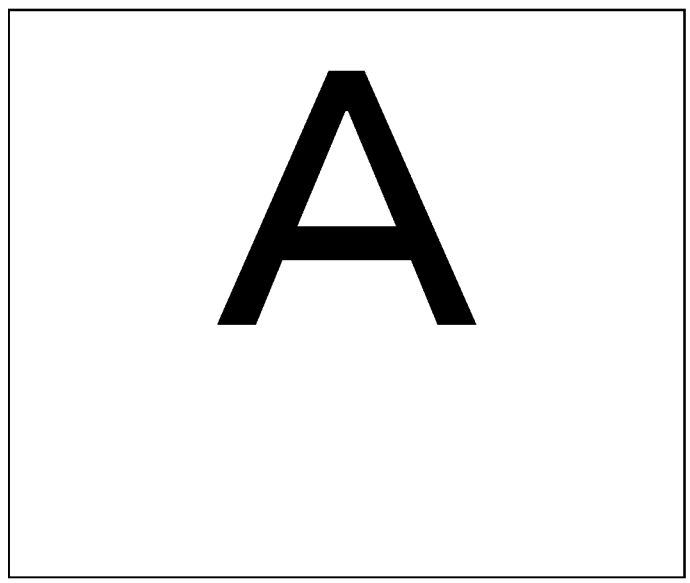

Referring now to FIGS. 10A and 10B, a description will be given of a position detecting method by the position detector 212. FIGS. 10A and 10B explain the position detecting method. FIG. 10A illustrates the surface (mark "A") of the movable portion 100 captured with the image sensor 217 in the position detector 212. FIG. 10B illustrates the surface of the movable portion 100 captured with the image sensor 217 in the position detector 212 after a predetermined time after the surface illustrated in FIG. 10A is imaged. The position detector 212 holds the mark (pattern) of the captured image in FIG. 10A and detects the moving amount of the movable portion 100 by detecting how the mark (pattern) of the captured image in FIG. 10B moves. Thus, the position detector 212 detects the moving amount of the movable portion 100 by continuously detecting how the captured mark (pattern) moves.

Figure 11:
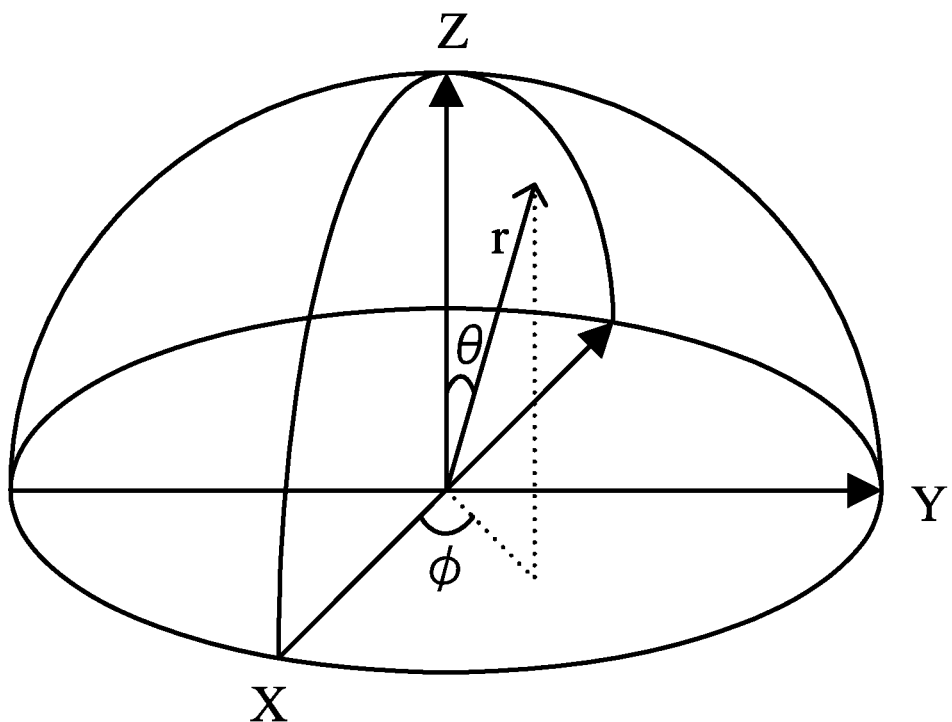
FIG. 11 explains a coordinate system according to the fifth embodiment.

Referring now to FIG. 11, a description will be given of a spherical coordinate system regarding the orientation of the optical axis O of the movable portion 100 (camera orientation) relative to the fixed portion 200. FIG. 11 explains a spherical coordinate system. The spherical coordinate system is a polar coordinate system expressed by one moving radius (radial coordinate) r and two angles (angular coordinates) θ and φ. The first angle θ is an angle between a certain axis (z axis in FIG. 11) and the moving radius r. The second angle φ is an angle between another axis (x-axis in FIG. 11) on a plane orthogonal to that axis (z axis) and the projection of the moving radius r onto this plane. The spherical coordinate system in FIG. 11 is also applied to a sixth embodiment described later.

Figure 12:
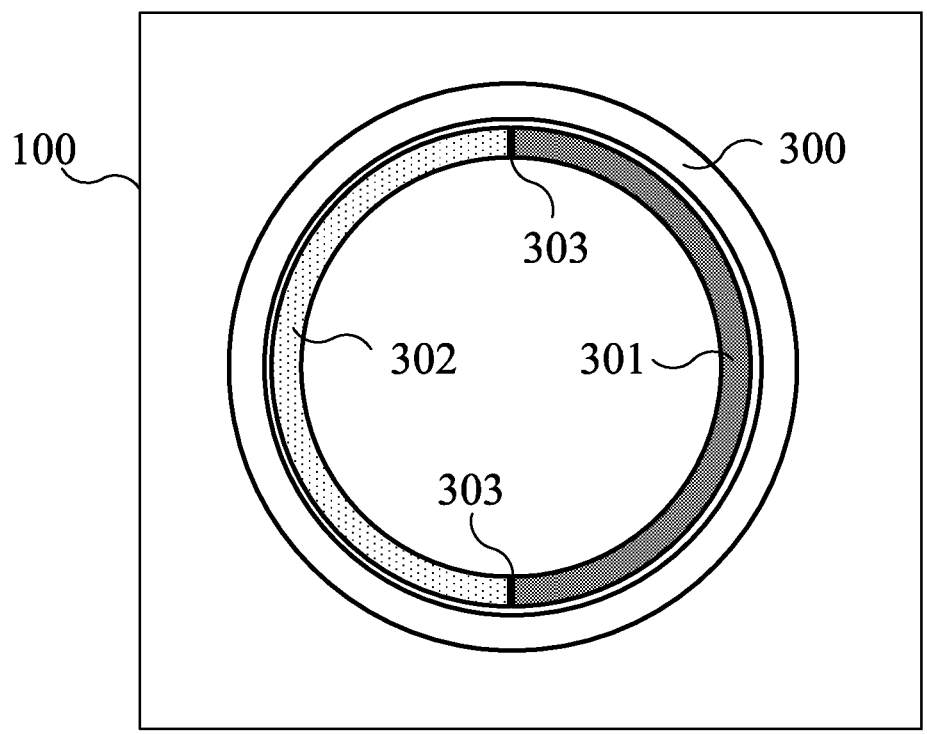
FIG. 12 explains a surface structure of a movable portion according to the fifth embodiment.

Referring now to FIG. 12, a description will be given of the surface structure of the movable portion 100. FIG. 12 explains the surface structure of the movable portion 100. The surface structure of the movable portion 100 has a two-layer structure, and includes an outer shell (outer part) 300 in contact with each of the vibrators 11 to 13, and an inner shell having a first inner shell (inner part) 301 and a second inner shell 302 provided inside the outer shell 300. The outer shell 300 is made of a high-transmittance material. Each of the first inner shell 301 and the second inner shell 302 has undergone a surface treatment and is made of a material having a different reflectance. In this embodiment, the first inner shell 301 has a first reflectance, and the second inner shell has a second reflectance higher than the first reflectance. Therefore, when the first inner shell 301 and the second inner shell 302 are respectively captured using the image sensor 217 in the position detector 212, a difference occurs in luminance value (luminance information) of the captured images.

In this embodiment, a boundary portion 303 between the first inner shell 301 and the second inner shell 302 is configured such that the reflectance (the luminance value corresponding to the reflectance) gradually changes. That is, the boundary portion 303 has a third reflectance that changes between the first reflectance and the second reflectance. The boundary portion 303 may use a third inner shell whose reflectance gradually changes between the first inner shell 301 and the second inner shell 302, or at least one of the first inner shell 301 and the second inner shell 302 may have an area having the reflectance that gradually changes in the boundary portion.

Figure 13:
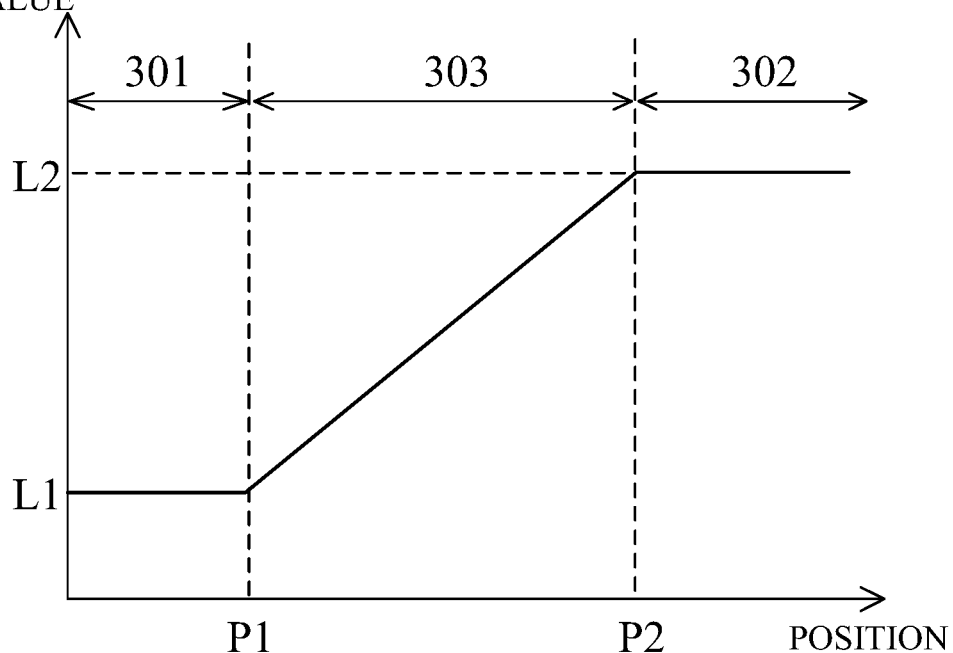
FIG. 13 illustrates a relationship between an inner shell of the movable portion and a luminance value according to the fifth embodiment.

Referring now to FIG. 13, a description will be given of luminance value changes in the images obtained by capturing the first inner shell 301, the second inner shell 302, and the boundary area (boundary portion 303) between the first inner shell 301 and the second inner shell 302. FIG. 13 illustrates a relationship between the inner shell (the first inner shell 301 and the second inner shell 302) of the movable portion 100 and the luminance value. In FIG. 13, the abscissa axis represents the position, and the ordinate axis indicates the luminance value. As illustrated in FIG. 13, L1 is a luminance value corresponding to the first inner shell 301, L2 is a luminance value corresponding to the second inner shell 302, and the luminance value corresponding to the boundary area between the positions P1 and P2 linearly changes from the luminance value L1 to the luminance value L2 from the position P1 to the position P2. Hence, the image sensor 217 acquires the luminance value L1 (first luminance value) when capturing the first inner shell 301 and acquires the luminance value L2 (second luminance value) when capturing the second inner shell 302. The image sensor 217 acquires the third luminance value (a luminance value that changes between the luminance values L1 and L2) when capturing the boundary portion 303.

Since the outer shell 300 is made of a high transmittance material, even when the first inner shell 301 or the second inner shell 302 is imaged from outside the outer shell 300 using the image sensor 217 of the position detector 212, a luminance value difference between the first inner shell 301 and the second inner shell 302 can be recognized. Since the outer shell 300 is made of a homogeneous material, the frictional force generated between the outer shell 300 and each of the vibrators 11 to 13 is stable irrespective of the contact position between the outer shell 300 and each of the vibrators 11 to 13.

Figure 14:
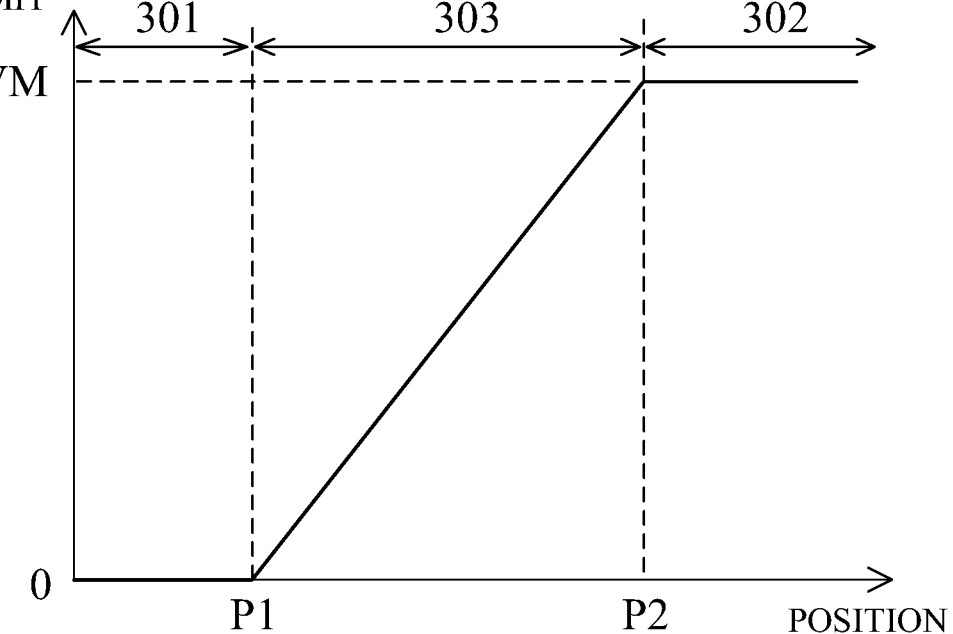
FIG. 14 illustrates a relationship between the inner shell of the movable portion and a control speed limit according to the fifth embodiment.

Referring now to FIG. 14, a description will be given of setting the control speed limit when the movable portion 100 is driven and controlled. FIG. 14 illustrates a relationship between the inner shell of the movable portion 100 and the control speed limit. The control speed limit corresponds to the maximum drive speed of the movable portion 100, and is set according to the luminance value of an image acquired with the image sensor 217 in the position detector 212.

Where the luminance value is low like the area of the first inner shell 301 (in case of the luminance value L1), the maximum speed as the speed limiter is set to 0. That is, when the luminance value of the image captured by the image sensor 217 is L1, the central controller 201 (the movable portion controller 211) stops driving the movable portion 100. On the other hand, when the luminance value is high like the area of the second inner shell 302 (in the case of the luminance value L2), the maximum controllable drive speed VM is set as the speed limiter. That is, when the luminance value of the image captured by the image sensor 217 is L2, the central controller 201 (the movable portion controller 211) continues to drive the movable portion 100. In the boundary area between the first inner shell 301 and the second inner shell 302, the control speed limit changes according to the luminance value, and when the movable portion 100 is driven from the position P2 of the second inner shell 302 to the position P1 of the first inner shell 301, the movable portion 100 gradually decelerates and stops.

In this embodiment, the first inner shell 301 is disposed such that the image sensor 217 reads the first inner shell 301 at a position where the member (the fixed portion 200) configuring the imaging apparatus 1 is reflected on the imaging unit 102. On the other hand, the second inner shell 302 is disposed such that the image sensor 217 reads the second inner shell 302 at a position where the members constituting the imaging apparatus 1 are not reflected in the imaging unit 102. By disposing the first inner shell 301 and the second inner shell 302 in this manner, the movable portion 100 stops at the position where the first inner shell 301 is read. Therefore, the members constituting the imaging apparatus 1 can be prevented from driving the movable portion 100 in a direction in which the members are reflected on the imaging unit 102. Thus, the imaging unit 102 can be prevented from capturing at least part of the fixed portion 200.

Figure 15:
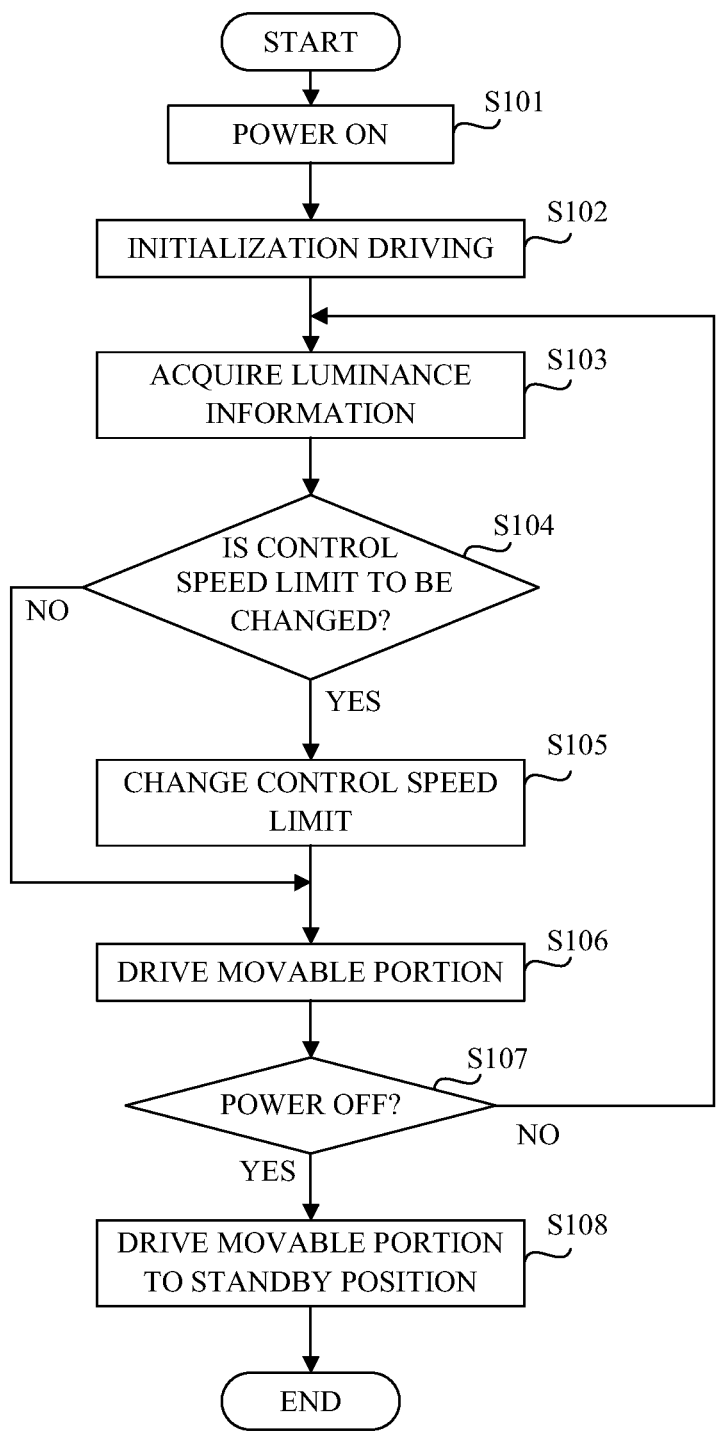
FIG. 15 is a flowchart showing an imaging operation according to the fifth embodiment.

Referring now to FIG. 15, a description will be given of the imaging operation of the imaging apparatus 1. FIG. 15 is a flowchart showing the imaging operation. Each step in FIG. 15 is mainly executed based on a command from the central controller 201 of the imaging apparatus 1.

Initially, in the step S101, the power of the imaging apparatus 1 is turned on. Next, in the step S102, the movable portion controller 211 performs an initialization operation to drive the movable portion 100 to the initial position and to fix the movable portion 100. Next, in the step S103, the central controller 201 calculates a luminance value (luminance information) of the image acquired by the image sensor 217.

Next, in the step S104, the central controller 201 determines whether it is necessary to change the currently set control speed limit based on the luminance value (luminance information) acquired in the step S103. For example, when the boundary area or the first inner shell 301 is changed from the state where the second inner shell 302 is being imaged to the state where the first inner shell 301 is imaged, that is, when the luminance value reduces, the central controller 201 determines that the control limit needs to be changed. If the control speed limit needs to be changed, the flow proceeds to the step S105. In the step S105, the central controller 201 changes the control speed limit, and proceeds to the step S106. On the other hand, when it is not necessary to change the control speed limit, the flow skips the step S105 and proceeds to the step S106.

In the step S106, the central controller 201 drives the movable portion 100 with the currently set control speed limit as the maximum drive speed. In this embodiment, when the luminance value is L1, the control speed limit (maximum drive speed) is 0, so that the central controller 201 does not drive the movable portion 100. Next, in the step S107, the central controller 201 determines whether the power of the imaging apparatus 1 is turned off. If the power is not turned off, the flow returns to the step S103 and repeats steps S103 to S106. On the other hand, when the power of the imaging apparatus 1 is turned off, the flow proceeds to the step S108. In the step S108, the movable portion controller 211 drives the movable portion 100 to the standby position when the power is turned off, and ends this flow.

In this embodiment, the surface information of the movable portion 100 is information on the reflectance of the surface of the movable portion 100, but is not limited to this, as long as it can be distinguished using the image sensor 217, other information may be used such as color information. Further, in this embodiment, the movable portion controller 211 may change the maximum drive speed condition as a drive condition of the movable portion 100 according to the luminance information.

Even with an error occurs between the actual position of the movable portion and the detection position of the movable portion detected by the image sensor, this embodiment can provide an imaging apparatus and a control method of an imaging apparatus, each of which can record an image without light shielding.

Sixth Embodiment

Next follows an imaging apparatus according to a sixth embodiment of the present invention. The basic configuration of the imaging apparatus according to this embodiment is the same as that of the imaging apparatus 1 in the first embodiment described with reference to FIGS. 1 to 6, and thus a description thereof will be omitted.

Figure 16A:
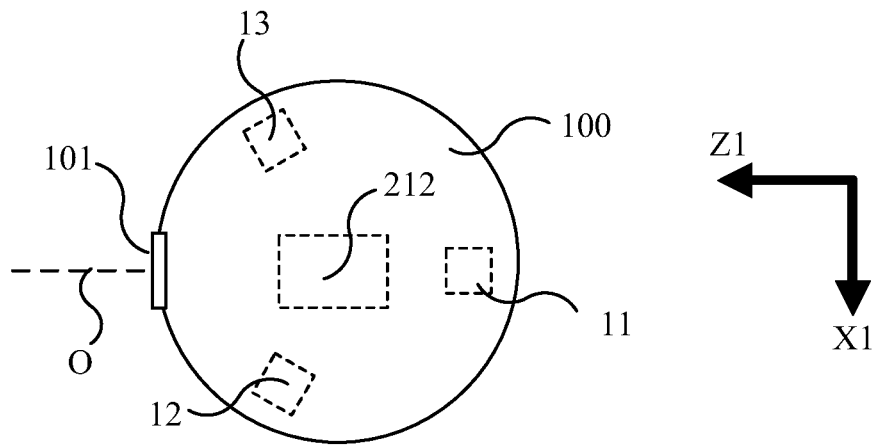
FIGS. 16A to 16C are plan views of an imaging apparatus according to a sixth embodiment.
Figure 16B:
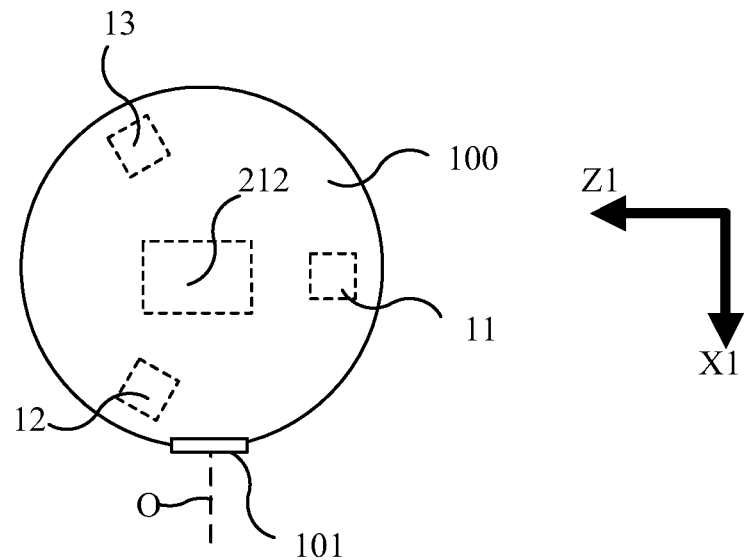
Figure 16C:
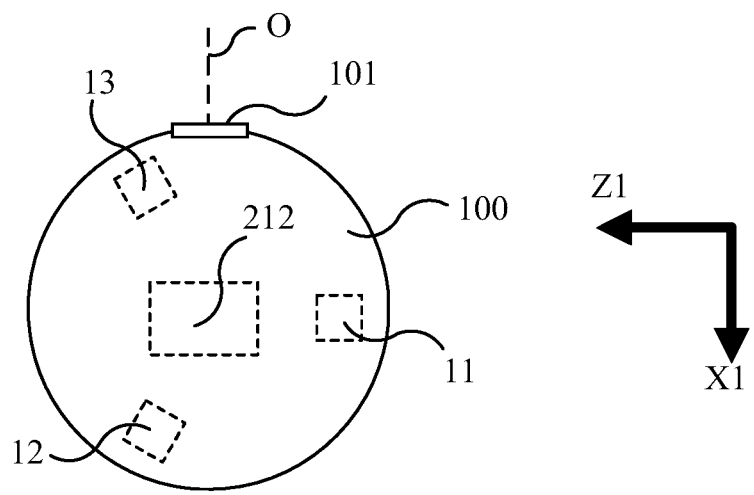
Figure 17A:
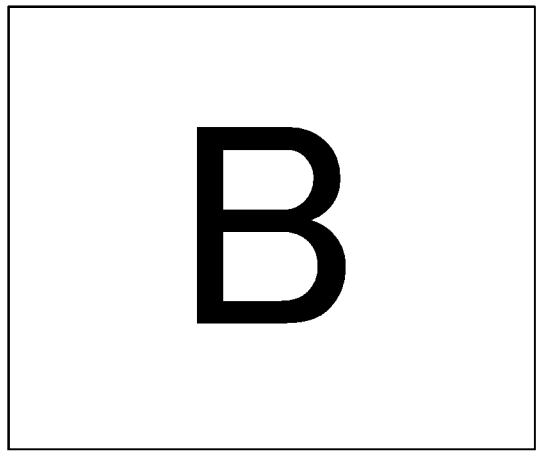
FIGS. 17A to 17C explain a surface image of a movable portion according to the sixth embodiment.
Figure 17B:
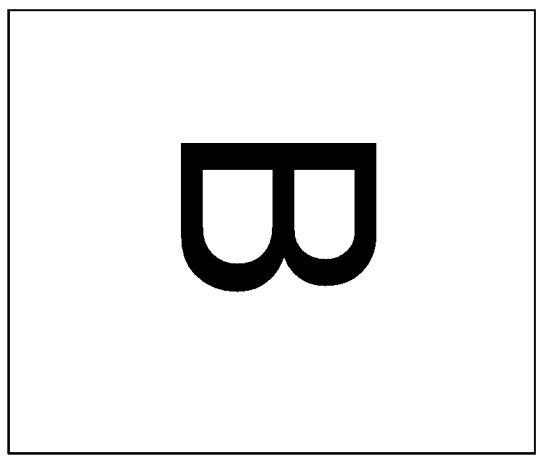
Figure 17C:
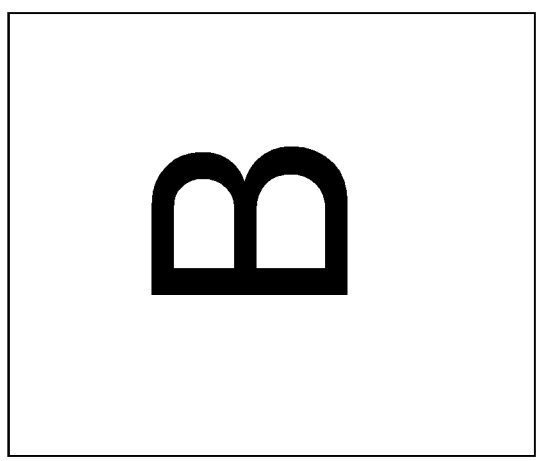

Referring now to FIGS. 16A to 17C, a description will be given of a relationship between a surface image of the movable portion 100 captured with the image sensor 217 in the position detector 212 and the orientation of the optical axis O of the movable portion 100. FIGS. 16A to 16C are plan views of the imaging apparatus 1. FIGS. 17A to 17C explain the surface images of the movable portion 100 captured with the image sensor 217 in the position detector 212, which are made by capturing the same mark "B".

FIG. 16A is the plan view of the imaging apparatus 1 when the movable portion 100 is held at the reference position. FIG. 17A illustrates the surface image of the movable portion 100 when the movable portion 100 is held at the reference position in FIG. 16A. FIG. 16B is the plan view of the imaging apparatus 1 where the movable portion 100 is held while being rotated counterclockwise from the reference position by 90°. FIG. 17B illustrates the surface image of the movable portion 100 when the movable portion 100 is held at the position illustrated in FIG. 16B. FIG. 16C is the plan view of the imaging apparatus 1 where the movable portion 100 is held while being rotated counterclockwise from the reference position by 90°. FIG. 17C illustrates the surface image of the movable portion 100 when the movable portion 100 is held at the position illustrated in FIG. 16C.

Thus, when the image sensor 217 in the position detector 212 captures an image of the same surface position of the movable portion 100, the inclination of the obtained image (or the inclination of the mark "B" or position in the rotating direction) is different according to the orientation of the optical axis O of the movable portion 100 (lens unit 101). Hence, the position detector 212 calculates (corrects) the orientation of the optical axis O of the movable portion 100 based on the position (surface position) of the movable portion 100 and the image inclination obtained at that position (image inclination information).

Figure 18A:
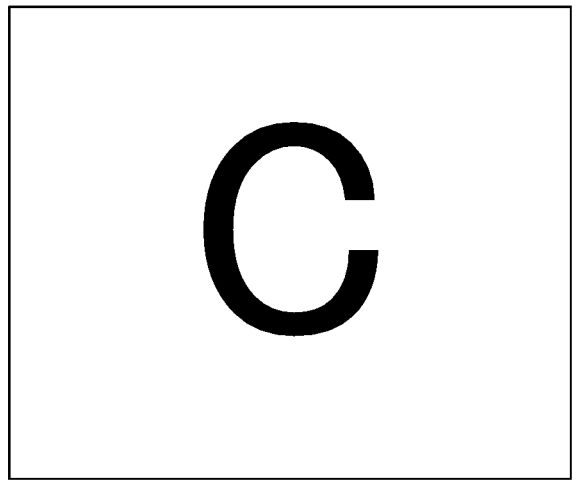
FIGS. 18A to 18C explain a position correcting method according to the sixth embodiment.
Figure 18B:
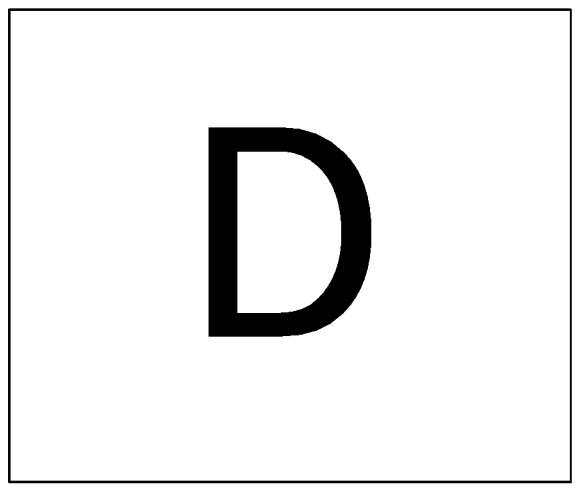
Figure 18C:

Referring now to FIGS. 18A to 18C, a description will be given of a method for correcting the position of the movable portion 100. FIGS. 18A to 18C explain the position correcting method, and illustrate an image of a mark (position information) printed on the surface of the movable portion 100. When an image "C" including the position information illustrated in FIG. 18A is obtained, the position corrector 213 analyzes the obtained image and obtains the position information (r1, θ1, φ1). Thereafter, the position information of the movable portion 100 detected and recorded by the position detector 212 is overwritten (updated or corrected) with the currently acquired position information (r1, θ1, φ1).

When an image "D" including the position information illustrated in FIG. 18B is obtained, the position corrector 213 analyzes the obtained image and obtains the position information (r2, δ2, φ2). Thereafter, the position information of the movable portion 100 detected and recorded by the position detector 212 is overwritten (updated or corrected) with the currently acquired position information (r2, θ2, φ2).

When the images "C" and "D" including the position information illustrated in FIG. 18C are obtained, the position corrector 213 analyzes the acquired images and obtains the position information (r1, θ1, φ1) and the position information (r2, θ2, φ2). When a plurality of pieces of position information are thus obtained, the position corrector 213 obtains position information ((r1+r2)/2, (θ1+θ2)/2, (φ1+φ2)/2) that is the average position of them. Thereafter, the position information of the movable portion 100 detected and recorded by the position detector 212 is overwritten (updated or corrected) with the currently acquired position information ((r1+r2)/2, (θ1+θ2)/2, (φ1+φ2)/2). The position corrector 213 calculates the orientation of the optical axis O by analyzing the inclination of the acquired images "C" and "D", and updates (corrects) the information on the orientation of the optical axis O detected and recorded by the position detector 212.

In FIGS. 18A to 18C, the mark print indicating the position information is the images "C" and "D" is not limited to these alphabetical characters, and another mark may be used such as a dot pattern.

Figure 19:
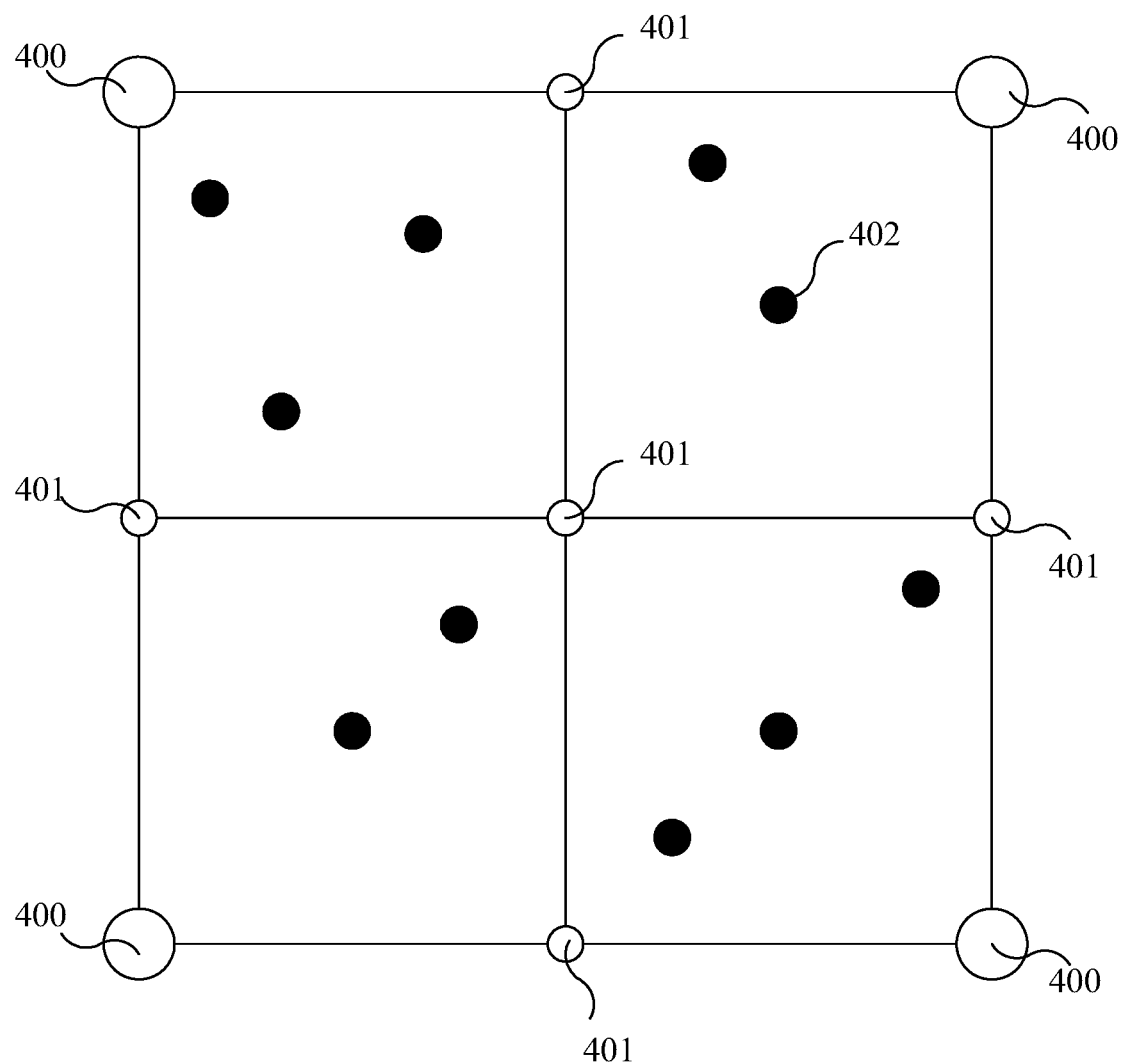
FIG. 19 explains a dot pattern as position information according to the sixth embodiment.

FIG. 19 explains the dot pattern serving as position information. In FIG. 19, a reference dot 400 is a reference dot for measuring the range and angle of the dot pattern. Lattice dots 401 are arranged at equal intervals between adjacent reference dots 400 so as to surround the information dots 402 and serve as a reference used to analyze the information dots 402. The information dots 402 have the position information as a bit string at positions in an area surrounded by the lattice dots 401. Thus, the position corrector 213 can correct the position information and the information on the orientation of the optical axis O based on the dot pattern array information (dot array information).

Figure 20:
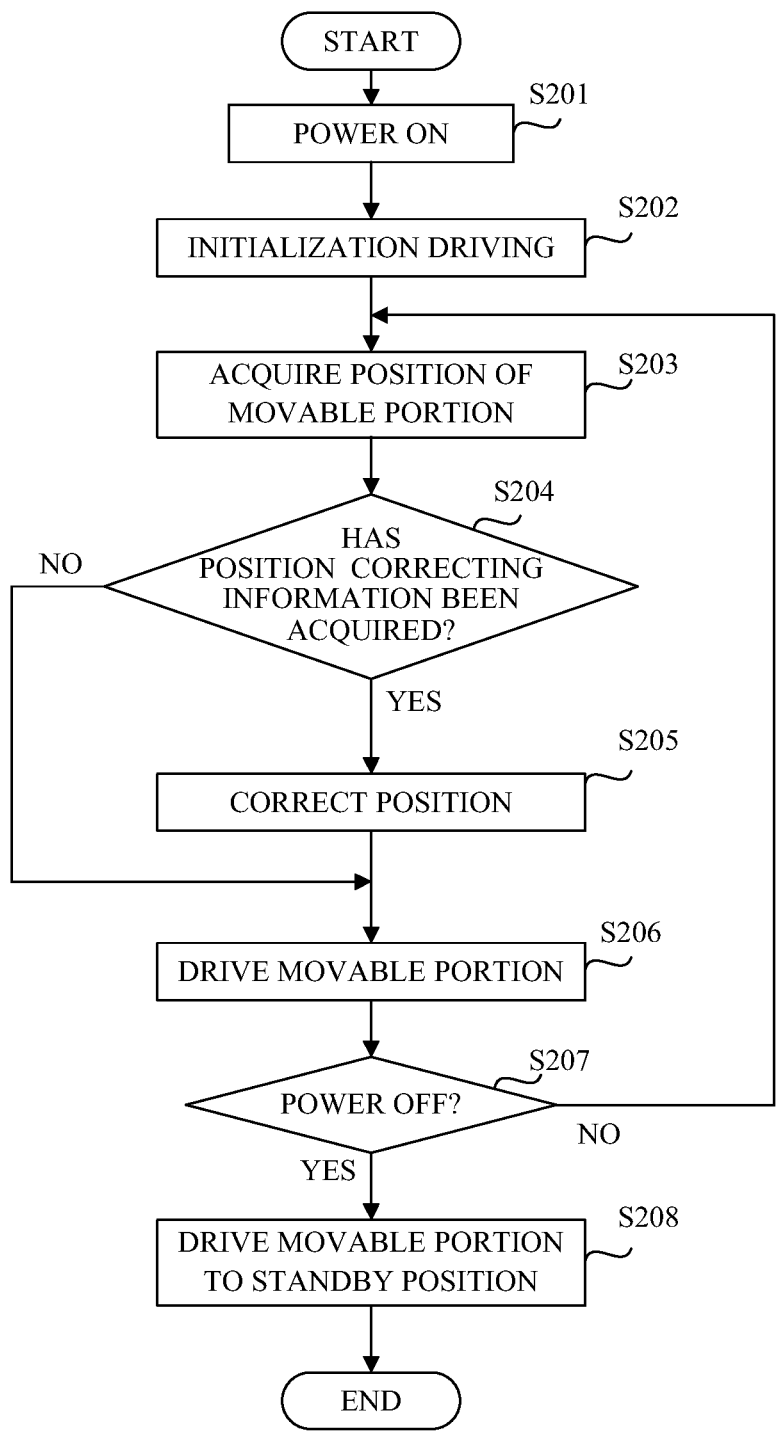
FIG. 20 is a flowchart showing an imaging operation according to the sixth embodiment.

Referring now to FIG. 20, a description will be given of the imaging operation of the imaging apparatus 1. FIG. 20 is a flowchart showing the imaging operation. Each step in FIG. 20 is mainly executed based on a command from the central controller 201 in the imaging apparatus 1.

Initially, in the step S201, the imaging apparatus 1 is powered on. Next, in the step S202, the movable portion controller 211 performs an initialization operation to drive the movable portion 100 to the initial position and to fix the movable portion 100. Next, in the step S203, the central controller 201 calculates the current position of the movable portion 100 based on the image acquired by the image sensor 217 in the position detector 212. Next, in the step S204, the central controller 201 determines whether or not the image acquired in the step S203 includes position correcting information (whether or not the acquired image has position correcting information). If the acquired image includes the position correcting information, the flow proceeds to the step S205. In the step S205, the position corrector 213 corrects the position of the movable portion 100. At this time, the central controller 201 updates (corrects) the information on the orientation of the optical axis O based on the inclination of the acquired image (the image including the position correcting information). Then, the flow proceeds to the step S206.

On the other hand, if the image has no position correcting information in the step S204 (if position correcting information cannot be obtained from the image), the flow proceeds to the step S206. In the step S206, the movable portion controller 211 drives the movable portion 100. Next, in the step S207, the central controller 201 determines whether the imaging apparatus 1 is powered off. If the power is not turned off, the flow returns to the step S203 and repeats the steps S203 to S206. On the other hand, when the imaging apparatus 1 is powered off, the flow proceeds to step S208. In the step S208, the movable portion controller 211 drives the movable portion 100 to the standby position when the power is turned off, and ends this flow.

Thus, in this embodiment, the mark indicating the position information of the movable portion 100 is located on the surface of the movable portion 100, and the position corrector 213 corrects the position of the movable portion 100 based on the mark such as the dot pattern. The position corrector 213 may correct the position of the movable portion 100 based on the image of the mark captured by the image sensor 217. When the image captured by the image sensor 217 includes images of a plurality of marks, the position corrector 213 may correct the position of the movable portion 100 based on the average position of the plurality of marks. The position corrector 213 may correct the orientation of the optical axis O of the lens unit 101 based on the mark. The position corrector 213 may correct the orientation of the optical axis O based on the position of the movable portion 100 and the inclination information of the mark image. When the position detector 212 detects a mark, the controller (movable portion controller 211) may drive the movable portion 100 (based on the corrected position) after the position corrector 213 corrects the position of the movable portion 100. On the other hand, when the position detector 212 does not detect the mark, the controller may drive the movable portion 100 without the position corrector 213 correcting the position of the movable portion 100.

Even when an error occurs between the actual position of the movable portion and the position of the movable portion detected by the image sensor in detecting the position of the movable portion of the spherical structure, this embodiment can provide an imaging apparatus and a control method of the imaging apparatus, each of which can control the position of the movable portion with high accuracy.

Seventh Embodiment

Next follows a description of an imaging apparatus according to a seventh embodiment of the present invention. The basic configuration of the imaging apparatus according to this embodiment is the same as that of the imaging apparatus 1 in the first embodiment described with reference to FIGS. 1 to 6, and thus a description thereof will be omitted.

Figure 21A:
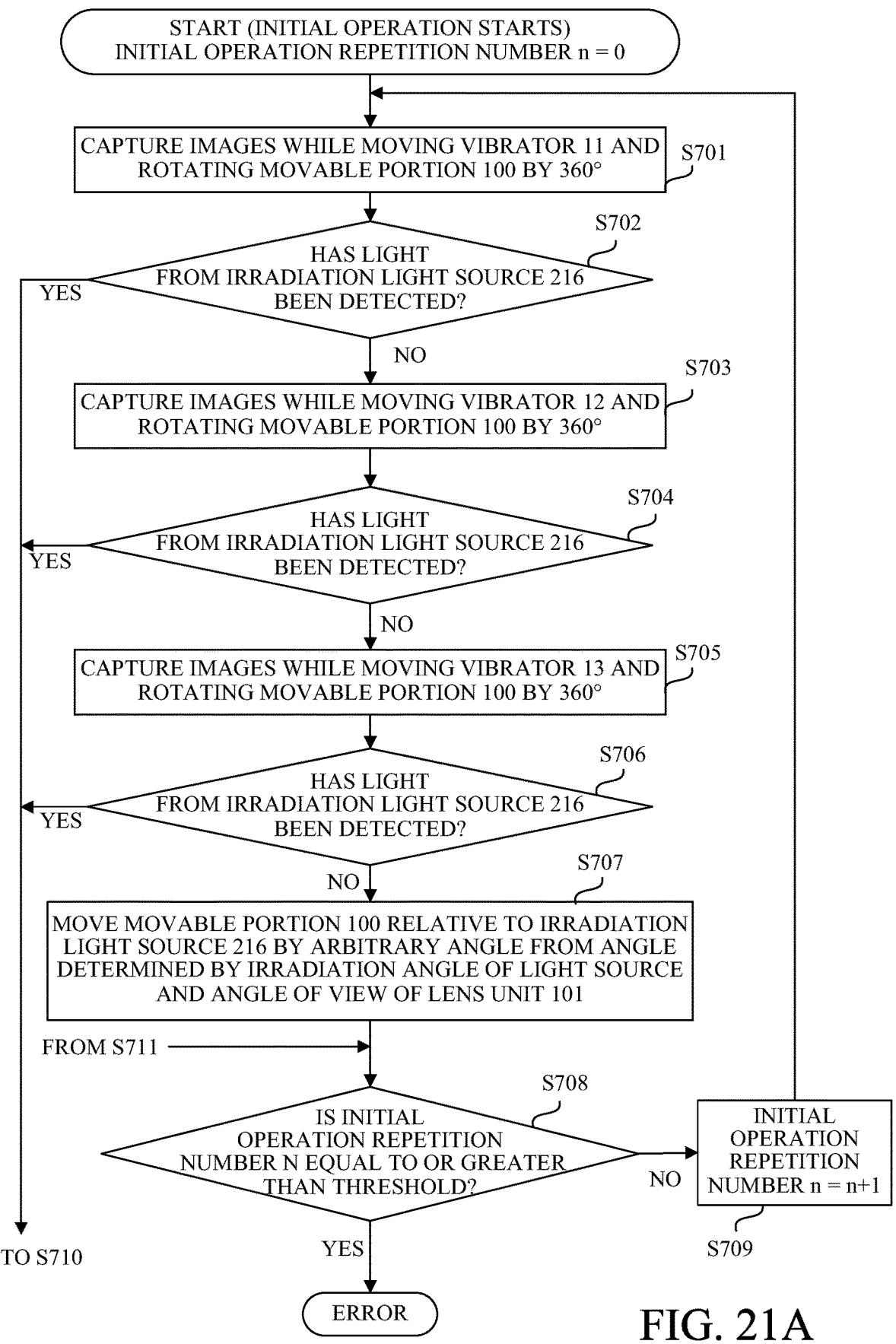
FIGS. 21A and 21B are flowcharts illustrating an initialization sequence for determining a reference direction of a movable portion according to a seventh embodiment.
Figure 21B:
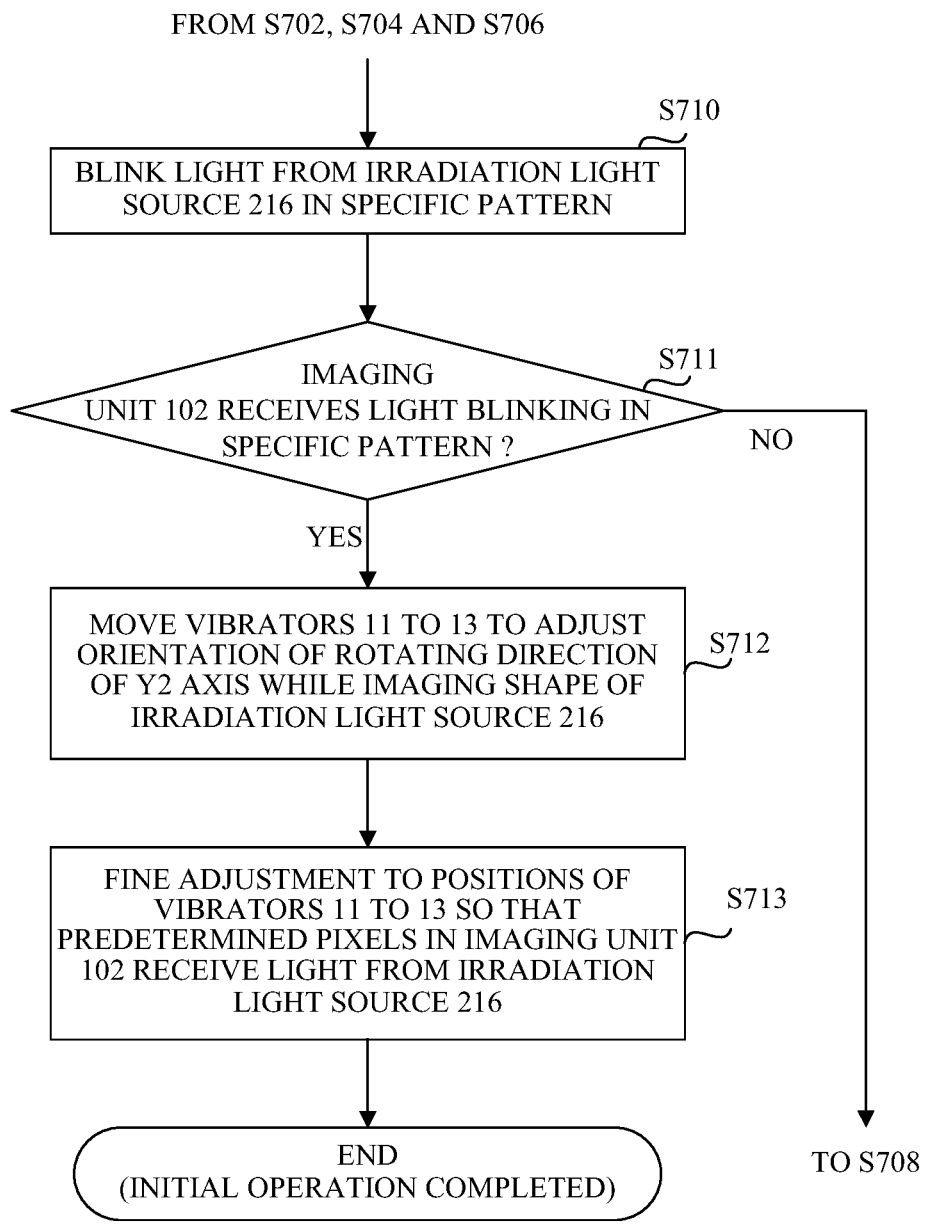

Referring now to FIGS. 21A and 21B, a description will be given of an initialization sequence (resetting operation) for determining the reference direction (reference position) of the movable portion 100 according to this embodiment. FIGS. 21A and 21B are flowcharts showing an initialization sequence for determining the reference direction of the movable portion 100. Each step in FIGS. 21A and 21B is mainly executed by each unit based on a command from central controller 201.

In this embodiment, the central controller 201 controls the orientation of the movable portion 100 so that part of the fixed portion 200 enters the imaging range. Then, the central controller 201 determines the reference direction (reference position) based on the position information (the position information of the movable portion 100 relative to the fixed portion 200) in the image acquired by the imaging with the lens unit 101. In this embodiment, the central controller 201 determines the direction of the movable portion 100 based on the position of the light source 216 that is part of the fixed portion 200. The light source 216 is disposed at a location where the Y2 axis in FIG. 5D intersects the fixed portion 200.

The flowchart in FIGS. 21A and 21B starts when the initial operation starts just after the imaging apparatus 1 starts. Assume that the initial operation repetition count n is set to 0 at the start. Operating according to the flowchart in FIGS. 21A and 21B can direct the lens unit 101 to the reference direction during the initial operation, regardless of the orientation of the lens unit 101.

Initially, in the step S701, the central controller 201 uses the movable portion controller 211 and moves the vibrator 11 that is part of the fixed portion 200, thereby capturing an image while rotating the movable portion 100 by 360°. During imaging in the step S701, in the step S702, the central controller 201 determines whether or not the imaging unit 102 has detected the light from the light source 216. If the imaging unit 102 detects the light from the light source 216, the flow proceeds to the step S710. On the other hand, if the imaging unit 102 has not detected the light from the light source 216, the flow returns to the position before the vibrator 11 is moved in the step S701, and then proceeds to the step S703.

In the step S703, the central controller 201 moves the vibrator 12 by using the movable portion controller 211, thereby capturing images while rotating the movable portion 100 by 360°. During imaging in the step S703, in the step S704, the central controller 201 determines whether or not the imaging unit 102 has detected the light from the light source 216. If the imaging unit 102 detects the light from the light source 216, the flow proceeds to the step S710. On the other hand, if the imaging unit 102 has not detected the light from the light source 216, the flow returns to the position before the vibrator 12 is moved in the step S703, and then proceeds to the step S705.

In the step S705, the central controller 201 moves the vibrator 13 using the movable portion controller 211, thereby capturing images while rotating the movable portion 100 by 360°. During imaging in the step S705, in the step S706, the central controller 201 determines whether or not the imaging unit 102 has detected the light from the light source 216. If the imaging unit 102 detects the light from the light source 216, the flow proceeds to the step S710. On the other hand, if the imaging unit 102 has not detected the light of the light source 216, the flow returns to the position before the vibrator 13 is moved in the step S705, and then proceeds to step S707.

Figure 22:
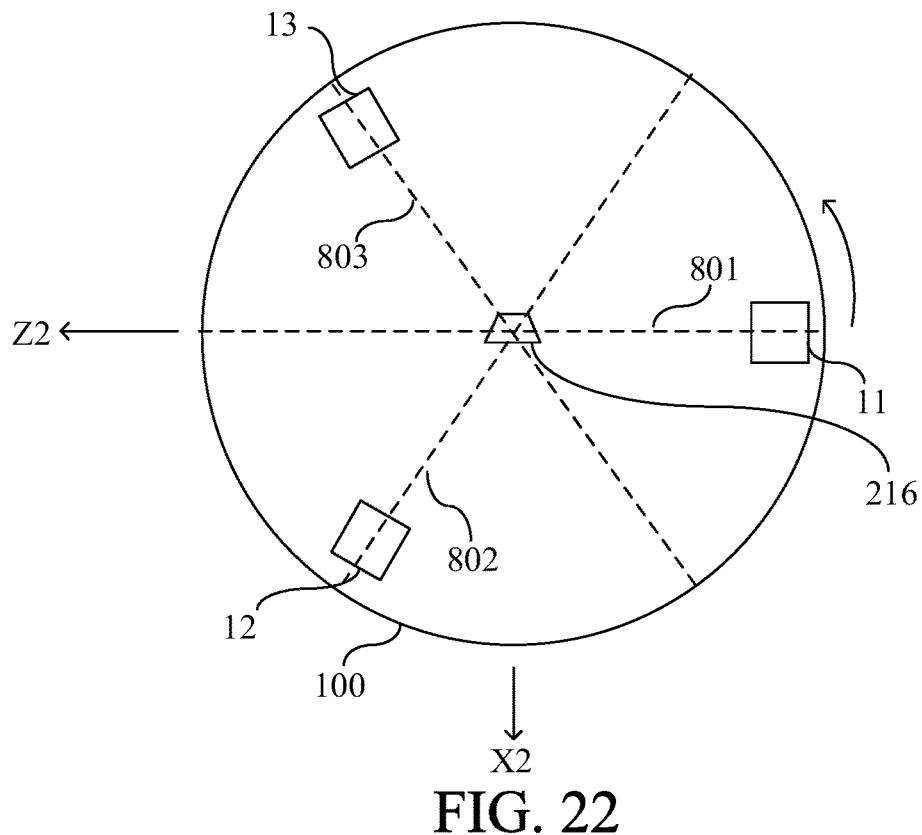
FIG. 22 explains an initialization sequence (step S707) according to the seventh embodiment.

In the step S707, as illustrated in FIG. 22, the central controller 201 moves the movable portion relative to the light source 216 by an arbitrary angle from the angle determined by the irradiation angle of the light source 216 and the angle of view of the lens unit 101. FIG. 22 explains the step S707 in FIG. 21A. This embodiment disposes the vibrators 11 to 13 in a direction rotated by 120° around the light source 216 as a center. The fact that the light source 216 cannot be detected even when the vibrators 11 to 13 are rotated by 360° means that the lens unit 101 did not exist at the position where the light from the light source 216 was irradiated.

In FIG. 22, three areas 801 to 803 irradiated with light from the light source 216 are drawn by dotted lines. The area 801 is irradiated with light by operating the vibrator 11 and thereby rotating the movable portion 100. The area 802 is irradiated with light by operating the vibrator 12 and thereby rotating the movable portion 100. The area 803 is irradiated with light by operating the vibrator 13 and thereby rotating the movable portion 100.

Turning back to the positions before the vibrator 13 is moved in the step S706 in FIG. 21A, the three areas 801 to 803 to which the light from the light source 216 is irradiated exist in directions rotated by 60° around the Y2 axis. Thus, rotating the movable portion 100 by 30° relative to the Y2 axis at the position at the start of the initial operation in the step S701 can irradiate light onto the area where the light from the light source 216 has not been irradiated. Thus, when the light source 216 disposed in a predetermined area of the fixed portion 200 is not included in the angle of view (imaging area α) of the lens unit 101, the central controller 201 changes the state at the start of the initial operation. That is, the central controller 201 changes the state at the start of the initial operation by rotating the movable portion 100 by a predetermined angle (30° in this embodiment).

When the movable portion 100 is rotated by 30° in the step S707, the flow proceeds to step S708. In the step S708, the central controller 201 determines whether the initial operation repetition number n is equal to or greater than a threshold value of the repetition number. When the initial operation repetition number n is equal to or greater than the threshold, the central controller 201 determines that an error has occurred and stops the initial operation. On the other hand, if the initial operation repetition count n is less than the threshold, the flow proceeds to the step S709. In the step S709, the central controller 201 adds 1 to the initial operation repetition number n, and returns to the step S701 to search for the light source 216.

In this embodiment, the capturable range of the lens unit 101 is equal to or more than one-eighth as long as the circumference of the movable portion 100. Therefore, due to the initialization sequence illustrated in FIGS. 21A and 21B, the imaging unit 102 can always detect the light from the light source 216. If the imaging unit 102 detects the light source 216 in the steps S702, S704, and S706, the flow proceeds to the step S710. In the step S710, the central controller 201 blinks the light from the light source 216 in a specific pattern.

Next, in the step S711, the central controller 201 determines whether or not the imaging unit 102 receives light blinking in the specific pattern. If the imaging unit 102 does not receive light that blinks in the specific pattern, it means that the lens unit 101 does not face the light source 216. Hence, after checking the initial operation repetition number n, the central controller 201 returns to the step S701. On the other hand, if the imaging unit 102 receives light that blinks in the specific pattern in the step S711, it means that the lens unit 101 faces the light source 216, and thus the flow proceeds to the step S712.

Figure 23:
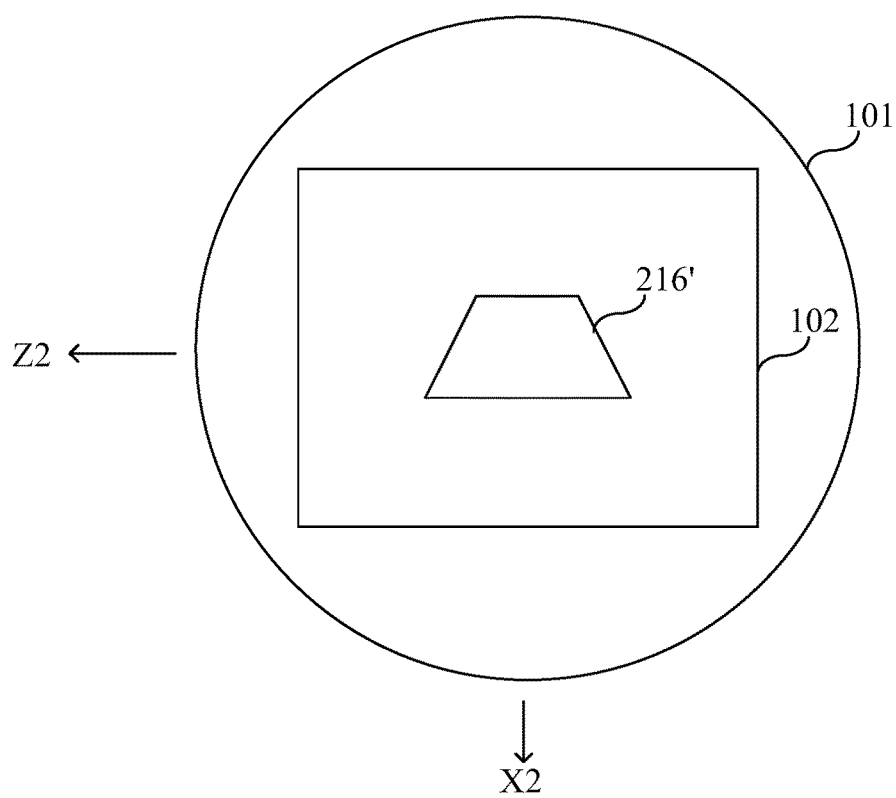
FIG. 23 explains a shape of a light source according to the seventh embodiment.

In the step S712, the central controller 201 operates the vibrators 11 to 13 while imaging the shape of the light source 216, and adjusts the rotating direction of the Y2 axis. The light from the light source 216 is exposed on the imaging unit 102. FIG. 23 explains the shape of the light source 216, and the shape of the projected light at this time is a shape 216' illustrated in FIG. 23. The shape 216' of the projected light is a shape or pattern that can uniquely determine the orientation when the movable portion 100 is rotated around the Y2 axis. Before the initial operation, the shape of the light source 216 is input into the memory in the central controller 201 inside the fixed portion 200, and the vibrators 11 to 13 are operated so that the rotating direction of the Y2 axis is correct.

Thereafter, in the step S713, the central controller 201 provides a fine adjustment to the positions of the vibrators 11 to 13 using the movable portion controller 211 so that predetermined pixels in the imaging unit 102 (or image sensor) receive light from the light source 216. Thereby, the reference position of the movable portion 100 is determined. When the step S713 is completed, the initial operation ends. The central controller 201 determines the reference direction (reference position) of the lens unit 101 by moving the movable portion 100 including the lens unit 101 using the vibrators 11 to 13 according to the initialization sequence illustrated in FIG. 21B. Therefore, this embodiment detects the position of the movable portion 100 relative to the fixed portion 200 when the imaging apparatus 1 is powered on (in the initial operation). Thus, the reference direction can be determined by imaging part of the fixed portion 200 (such as the light source 216) with the lens unit 101 in the movable portion 100.

Thus, in this embodiment, the central controller 201 controls the position of the movable portion 100 such that a predetermined area of the fixed portion 200 is included in the angle of view (imaging range α) of the lens unit 101. Then, the central controller 201 determines the reference position (reference direction) of the movable portion 100 based on the predetermined area included in the image acquired by the imaging unit 102. The predetermined area of the fixed portion 200 may have a shape or a pattern capable of uniquely determining the orientation of the movable portion 100 when the movable portion 100 is rotated around the optical axis O of the lens unit 101. The light source 216 may be provided in the predetermined area of the fixed portion 200.

This embodiment can provide a compact imaging apparatus which can detect the absolute position of the movable portion (sphere) relative to the fixed portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A driving apparatus comprising:
a movable portion;
a fixed portion configured to hold the movable portion;
a controller configured to control a position of the movable portion relative to the fixed portion; and
a position detector including an image sensor, and configured to detect a position of the movable portion,
wherein the image sensor acquires different luminance information depending on the position of the movable portion based on surface information of the movable portion,
wherein the movable portion includes an outer part, a first inner part, and a second inner part provided inside the outer part,
wherein the first inner part has a first reflectance, and the second inner part has a second reflectance higher than the first reflectance, and
wherein the image sensor obtains a first luminance value as the luminance information by imaging the first inner part, and obtains a second luminance value as the luminance information by imaging the second inner part.

2. The driving apparatus according to claim 1, wherein the surface information includes information on a reflectance of a surface of the movable portion.

3. The driving apparatus according to claim 1, wherein the controller changes a driving condition of the movable portion according to the luminance information acquired by the image sensor.

4. The driving apparatus according to claim 3, wherein the controller changes a maximum driving speed of the movable portion according to the luminance information.

5. The driving apparatus according to claim 1, wherein at least part of an outer surface of the movable portion is spherical.

6. The driving apparatus according to claim 1, wherein a boundary between the first inner part and the second inner part has a third reflectance that varies between the first reflectance and the second reflectance.

7. The driving apparatus according to claim 1, wherein the image sensor acquires the first luminance value corresponding to the first inner part when at least part of the driving apparatus is captured in an imaging unit of the movable portion.

8. The driving apparatus according to claim 1, wherein the controller sets a maximum drive speed of the movable portion to 0 when the image sensor acquires the first luminance value.

* * * * *